United States Patent
Kang et al.

(10) Patent No.: US 10,742,893 B2
(45) Date of Patent: Aug. 11, 2020

(54) MOBILE TERMINAL

(71) Applicant: LG ELECTRONICS INC., Seoul (KR)

(72) Inventors: Kyunghee Kang, Seoul (KR); Seunghwan Kang, Seoul (KR); Hyungseok Ji, Seoul (KR); Jinsool Lee, Seoul (KR); Sungbum Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 16/052,257

(22) Filed: Aug. 1, 2018

(65) Prior Publication Data

US 2019/0052790 A1 Feb. 14, 2019

(30) Foreign Application Priority Data

Aug. 10, 2017 (KR) .......................... 10-2017-0101923

(51) Int. Cl.
| | |
|---|---|
| *H04N 5/235* | (2006.01) |
| *G06T 5/00* | (2006.01) |
| *H04N 5/232* | (2006.01) |
| *H04N 1/60* | (2006.01) |

(52) U.S. Cl.
CPC ........... *H04N 5/2355* (2013.01); *G06T 5/007* (2013.01); *H04N 1/6002* (2013.01); *H04N 1/6019* (2013.01); *H04N 5/2353* (2013.01); *H04N 5/2354* (2013.01); *H04N 5/23293* (2013.01); *H04N 5/232935* (2018.08)

(58) Field of Classification Search
CPC ............. H04N 5/2355; H04N 5/23293; H04N 5/2354; H04N 5/2353; H04N 1/6019; H04N 1/6002; H04N 5/232935; G06T 5/007
See application file for complete search history.

(56) References Cited

U.S. PATENT DOCUMENTS

| | | | | | |
|---|---|---|---|---|---|
| 5,999,175 | A | * | 12/1999 | Nalder | ............... H04N 1/00352 358/1.18 |
| 2002/0071049 | A1 | * | 6/2002 | Bell | ...................... H04N 5/2351 348/364 |

(Continued)

OTHER PUBLICATIONS

Anonymous, "High Dynamic Range Image Encodings", Elsevier, 2010, pp. 91-118.

(Continued)

*Primary Examiner* — Timothy J Henn

(74) *Attorney, Agent, or Firm* — Birch, Stewart, Kolasch & Birch, LLP

(57) ABSTRACT

A mobile terminal including a camera having an image sensor; a memory; a display; and a controller configured to synthesize first image data generated by a first exposure and second image data generated by a second exposure, store a log image in the memory obtained by applying a log profile to the synthesized image data in a first mode, and display a first image on the display obtained by transforming the log image in a second mode. Further, the controller controls the first exposure and the second exposure based on first exposure information corresponding to an average brightness information and a maximum brightness information of the synthesized image data.

13 Claims, 16 Drawing Sheets

(56) References Cited

U.S. PATENT DOCUMENTS

| | | | | |
|---|---|---|---|---|
| 2005/0185055 A1* | 8/2005 | Miller | ............... | G06F 8/60 |
| | | | | 348/207.1 |
| 2008/0030814 A1* | 2/2008 | Ohara | ............... | H04N 1/4074 |
| | | | | 358/522 |
| 2009/0174795 A1* | 7/2009 | Kato | ............... | H04N 5/23222 |
| | | | | 348/234 |
| 2009/0303341 A1* | 12/2009 | Mikawa | ............... | H04N 1/6027 |
| | | | | 348/222.1 |
| 2012/0236020 A1* | 9/2012 | Paris | ............... | G06T 5/009 |
| | | | | 345/589 |
| 2012/0262600 A1* | 10/2012 | Velarde | ............... | H04N 5/2355 |
| | | | | 348/223.1 |
| 2014/0028881 A1* | 1/2014 | Miyatani | ............... | H04N 5/3572 |
| | | | | 348/246 |
| 2014/0347521 A1* | 11/2014 | Hasinoff | ............... | H04N 5/2355 |
| | | | | 348/239 |
| 2015/0054985 A1 | 2/2015 | Baek et al. | | |
| 2015/0078661 A1* | 3/2015 | Granados | ............... | G06T 5/009 |
| | | | | 382/167 |
| 2015/0130967 A1* | 5/2015 | Pieper | ............... | H04N 5/2355 |
| | | | | 348/239 |
| 2015/0244923 A1* | 8/2015 | Lee | ............... | H04N 9/045 |
| | | | | 348/234 |
| 2017/0094145 A1 | 3/2017 | Miketa et al. | | |
| 2017/0154456 A1* | 6/2017 | Cao | ............... | H04N 5/2355 |

OTHER PUBLICATIONS

Anonymous, "Work with Lightroom for Mobile", Lightroom for mobile, Jul. 15, 2017, pp. 1-27.

* cited by examiner

FIG. 5
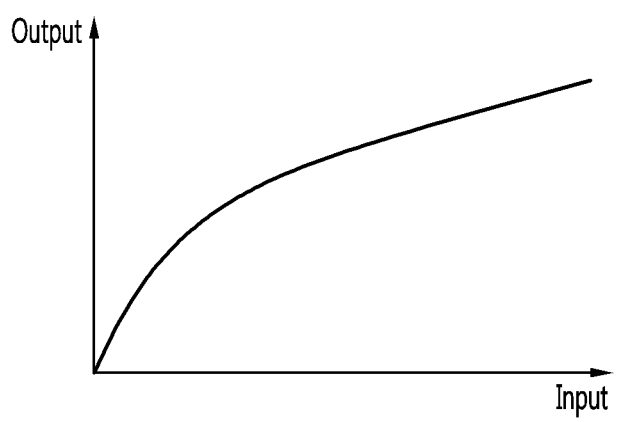
(a)
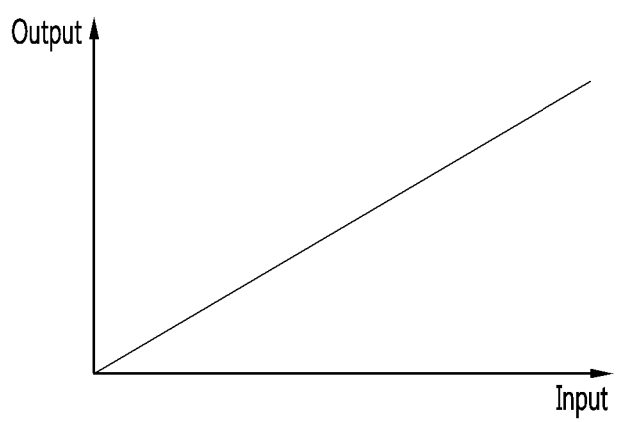
(b)

FIG. 7
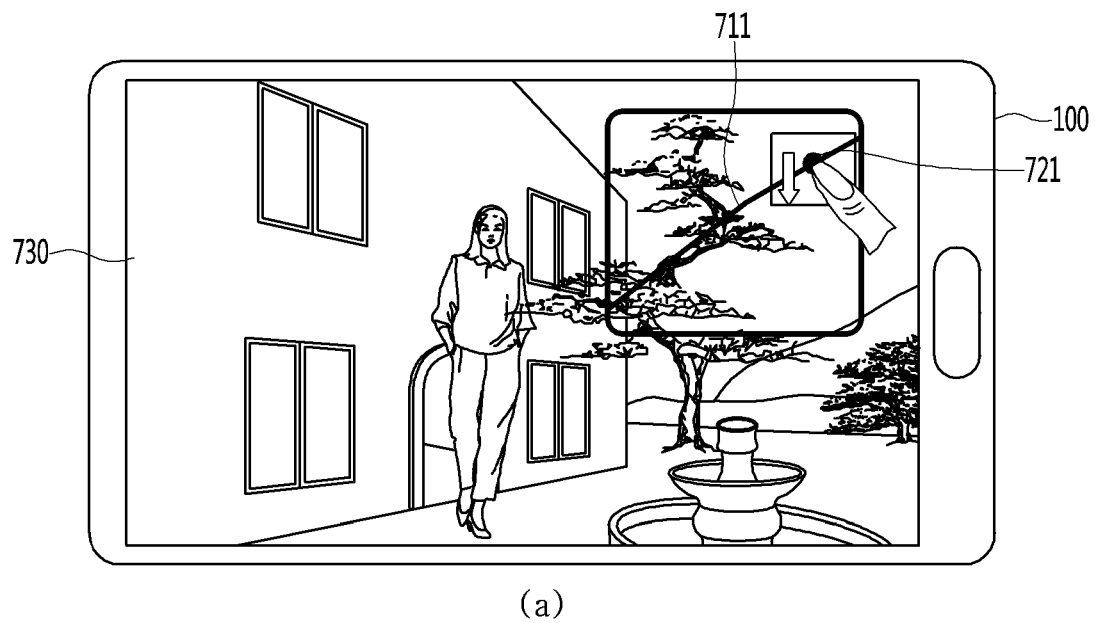
(a)
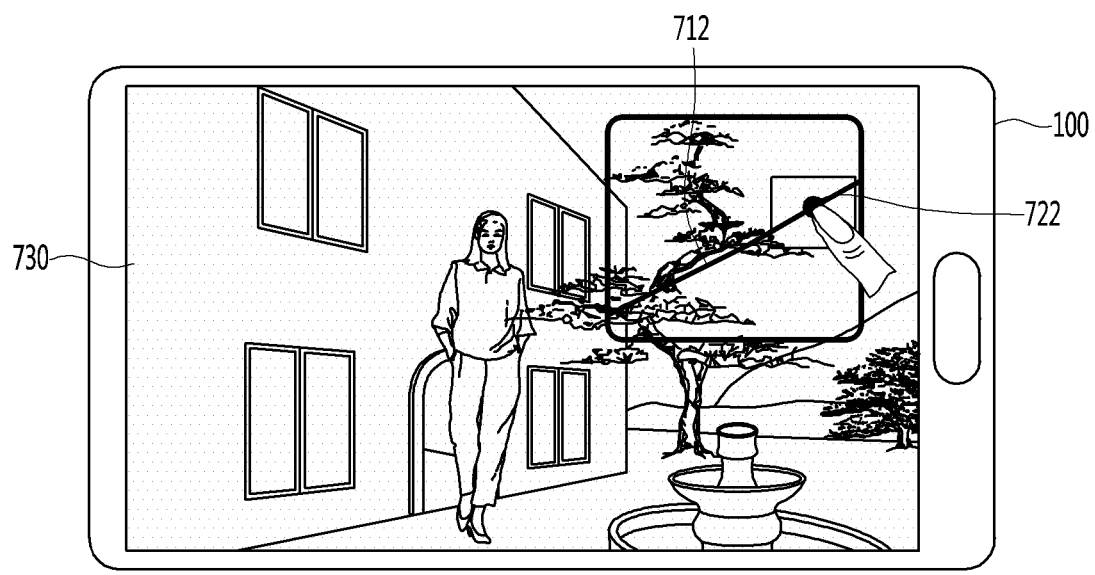
(b)

FIG. 12
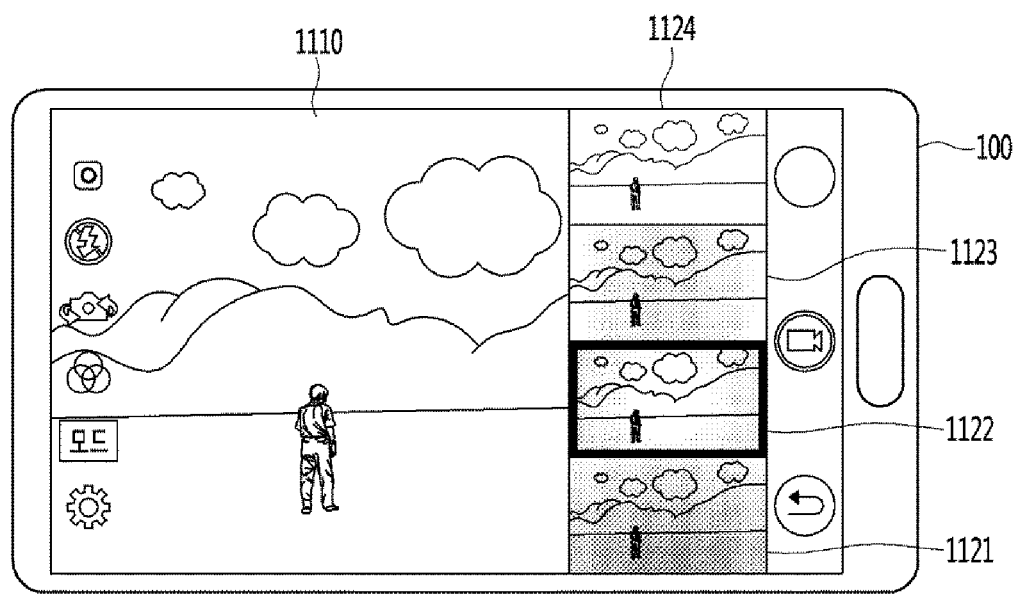
(a)
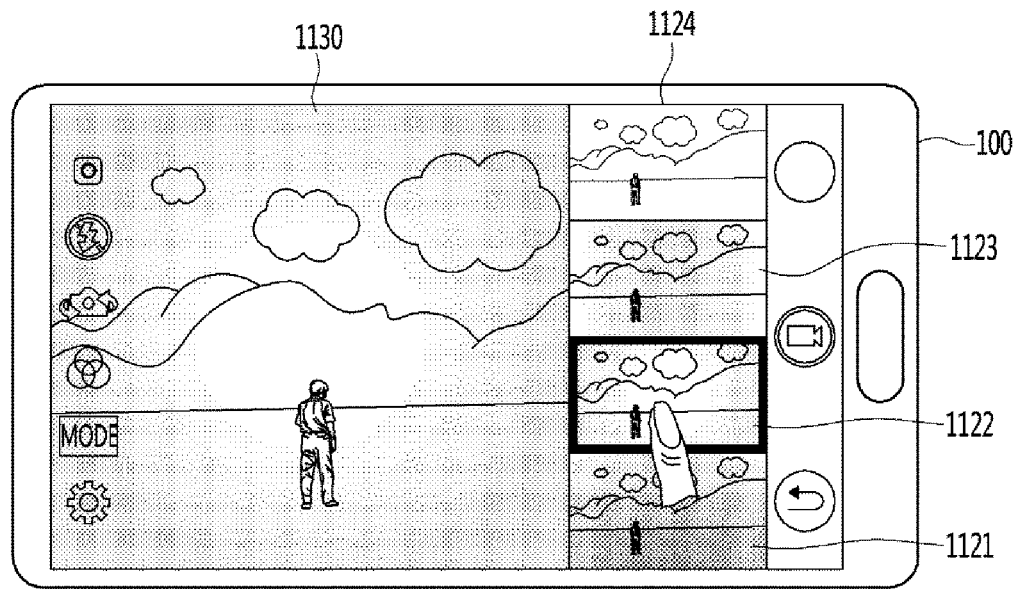
(b)

MOBILE TERMINAL

CROSS-REFERENCE TO RELATED APPLICATIONS

This application claims priority to Korean Patent Application No. 10-2017-0101923 filed in Republic of Korea on Aug. 10, 2017, the entire contents of which are hereby incorporated by reference in their entirety.

BACKGROUND

Terminals may be generally classified as mobile/portable terminals or stationary terminals. Mobile terminals may also be classified as handheld terminals or vehicle mounted terminals.

Recently, high dynamic range (HDR) technology of synthesizing a plurality of images captured using different exposure information to provide enhanced contrast has been appearing. Currently, a mobile terminal provides a standard dynamic range (SDR) image output display. Accordingly, in order to display a high dynamic range image on the mobile terminal, a tone mapping process of transforming an HDR image into an SDR image is required. However, when tone mapping is performed, HDR image included in the HDR image may be lost.

In addition, conventionally, when a camera exposure is adjusted to capture a high dynamic range (HDR) image, a method of adjusting a camera exposure (sensitivity, exposure time, etc.) by comparing a target light amount with a current light amount was employed. If such a method is used, it may be impossible to reach the target light amount due to a change in target light amount.

SUMMARY

One object of the present invention is to provide a mobile terminal capable of storing a log-captured image and displaying an image containing HDR information using the log-captured image.

Another object of the present invention is to provide a mobile terminal for controlling camera exposure for HDR based on an absolute light amount.

To achieve these and other advantages and in accordance with the purpose of the present invention, as embodied and broadly described herein, the present invention provides in one aspect a mobile terminal including a camera including an image sensor, a storage unit for storing data, and a controller for generating synthesized image data obtained by synthesizing first image data generated by a first exposure and second image data generated by a second exposure, storing a log image obtained by applying a log profile to the synthesized image data in a first mode, and outputting a display image obtained by transforming the log image in a second mode. The controller controls the first exposure and the second exposure based on first exposure information corresponding to average brightness information and maximum brightness information of the synthesized image data.

In another aspect, the present invention provides a mobile terminal according to another embodiment of the present invention includes a camera including an image sensor, a storage unit for storing data, and a controller for generating synthesized image data obtained by synthesizing first image data generated by a first exposure and second image data generated by a second exposure, storing a log image obtained by applying a log profile to the synthesized image data in a first mode, and storing a display image obtained by transforming the synthesized image data in a third mode. The controller controls the first exposure and the second exposure based on first exposure information corresponding to average brightness information and maximum brightness information of the synthesized image data.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is a view illustrating a method of compressing synthesized image data according to a mode of a mobile terminal according to an embodiment of the present invention.

FIG. 7 is a view illustrating a method of displaying a tone adjustment curve and adjusting a tone according to an embodiment of the present invention.

FIG. 12 is a view illustrating a method of applying a filter in a second mode according to an embodiment of the present invention.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
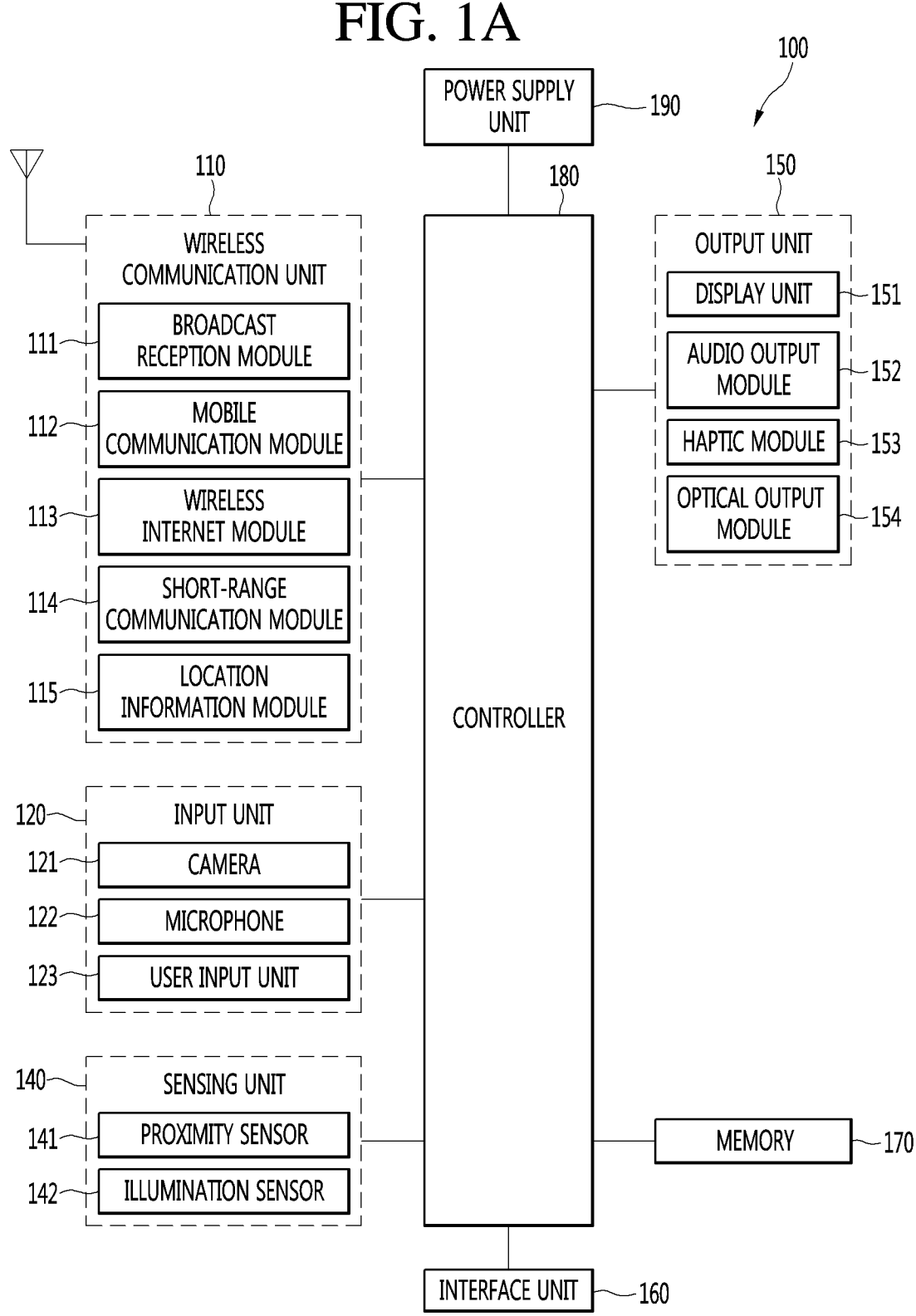
FIG. 1A is a block diagram of a mobile terminal in accordance with the present disclosure.
Figure 1B:
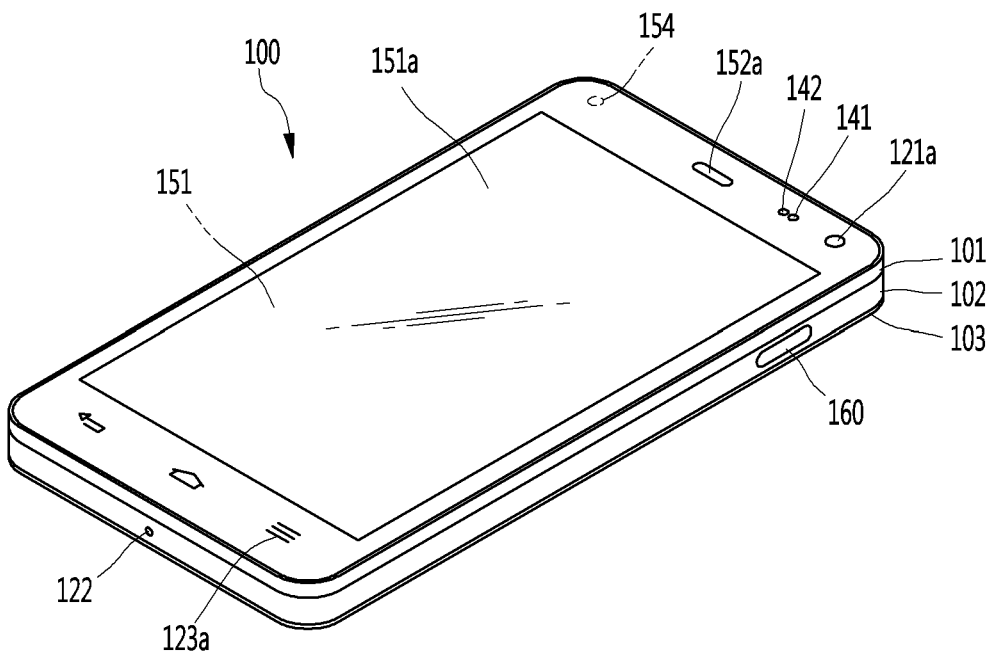
FIGS. 1B and 1C are conceptual views of one example of the mobile terminal, viewed from different directions.
Figure 1C:
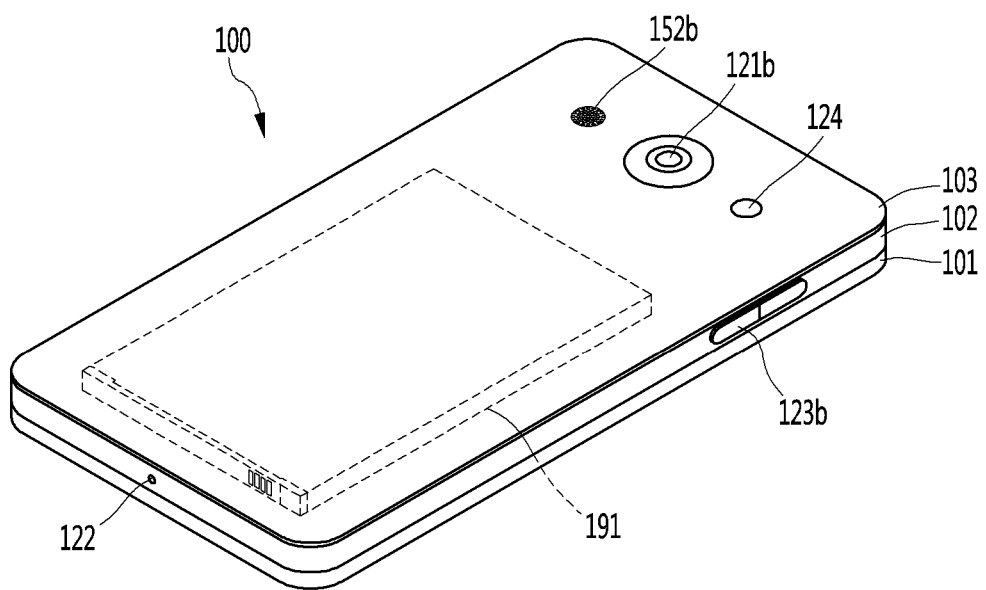

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. The touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. The touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen. In the present specification, the term memory 170 may be used interchangeably with a storage unit 170.

The input unit 120 of the mobile terminal 100 may include a sensing unit 140 and perform all functions of the sensing unit 140. For example, the input unit 120 may sense user touch input. The storage unit 170 may store data.

Figure 2:
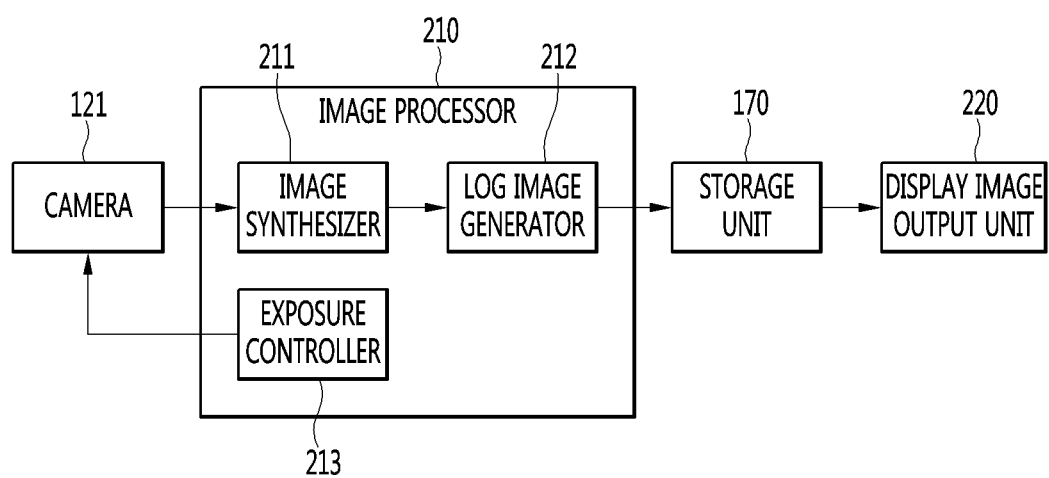
FIG. 2 is a block diagram illustrating the detailed configuration of a mobile terminal according to an embodiment of the present invention.

FIG. 2 is a block diagram illustrating the detailed configuration of a mobile terminal according to an embodiment of the present invention. The camera 121 can generate a plurality of image data by performing continuous capturing for a predetermined time, under control of the controller 180. Specifically, the camera 121 can apply a first exposure to capture a first image, under control of the controller 180.

The first exposure may include at least one of sensitivity (ISO) and an exposure time. For example, the first exposure can be expressed as a product of the sensitivity (ISO) and the exposure time. In addition, the camera 121 may include an image sensor, which transmits first image data generated by the first exposure to the controller 180.

In addition, the camera 121 can apply a second exposure to capture a second image, under control of the controller 180. The second exposure can also include at least one sensitivity (ISO) and an exposure time. For example, the second exposure can be expressed as a product of the sensitivity (ISO) and the exposure time.

The image sensor can also transmit second image data generated by the second exposure to the controller 180. Further, the first exposure and the second exposure are different from each other. Specifically, the first exposure can be a long exposure and the second exposure can be a short exposure. The product of the sensitivity (ISO) and the exposure time in the long exposure is greater than the product of the sensitivity (ISO) and the exposure time in the short exposure.

The controller 180 can receive the image data generated by the first exposure from the image sensor and receive the image data generated by the second exposure from the image sensor. An image synthesizer 211 can then generate synthesized image data by synthesizing the first image data and second image data. The synthesized image data includes high dynamic range (HDR) image data.

In a first mode, a log image generator 212 can store a log image obtained by applying a log profile to the synthesized image data. The log image includes high contrast ratio information by applying a logarithmic function to the image data. For example, if the image data obtained by synthesizing the first image data and the second image data has HDR information (e.g., dynamic range information of 14 stops), the log image generator 212 can apply a log profile to the synthesized image data, thereby generating a log image of 8-bit bit depth including HDR information (e.g., dynamic range information of 14 stops). The first mode is an expert capturing mode.

As described above, in the present invention, a maximum amount of information can be compressed and stored by generating the log image. Further, the controller 180 can store the generated log image in the storage unit 170.

Also, in a second mode, the controller 180 can display an image obtained by transforming the log image. The image is a standard dynamic range (SDR) image output on an SDR image output display. In addition, the image can be an SDR image indicating HDR information (e.g., dynamic range information of 14 stops), by tone-mapping the log image. The second mode is a cine video mode in which the log image is compressed and output on an SDR image output display.

In a third mode, the controller 180 can store a display image obtained by transforming the synthesized image data. Specifically, in the third mode, the controller 180 can store a display image obtained by tone-mapping and compressing the synthesized image data into an SDR image. The third mode is a normal capturing mode and has a concept opposite to the expert capturing mode (the first mode).

In addition, an exposure controller 213 controls the first exposure and the second exposure based on first exposure information corresponding to an average brightness information of the synthesized image data and a maximum brightness information of the synthesized image data. The first exposure information may include at least one of a sensitivity of the first exposure, an exposure time of the first exposure, a sensitivity of the second exposure and an exposure time of the second exposure.

Figure 3:
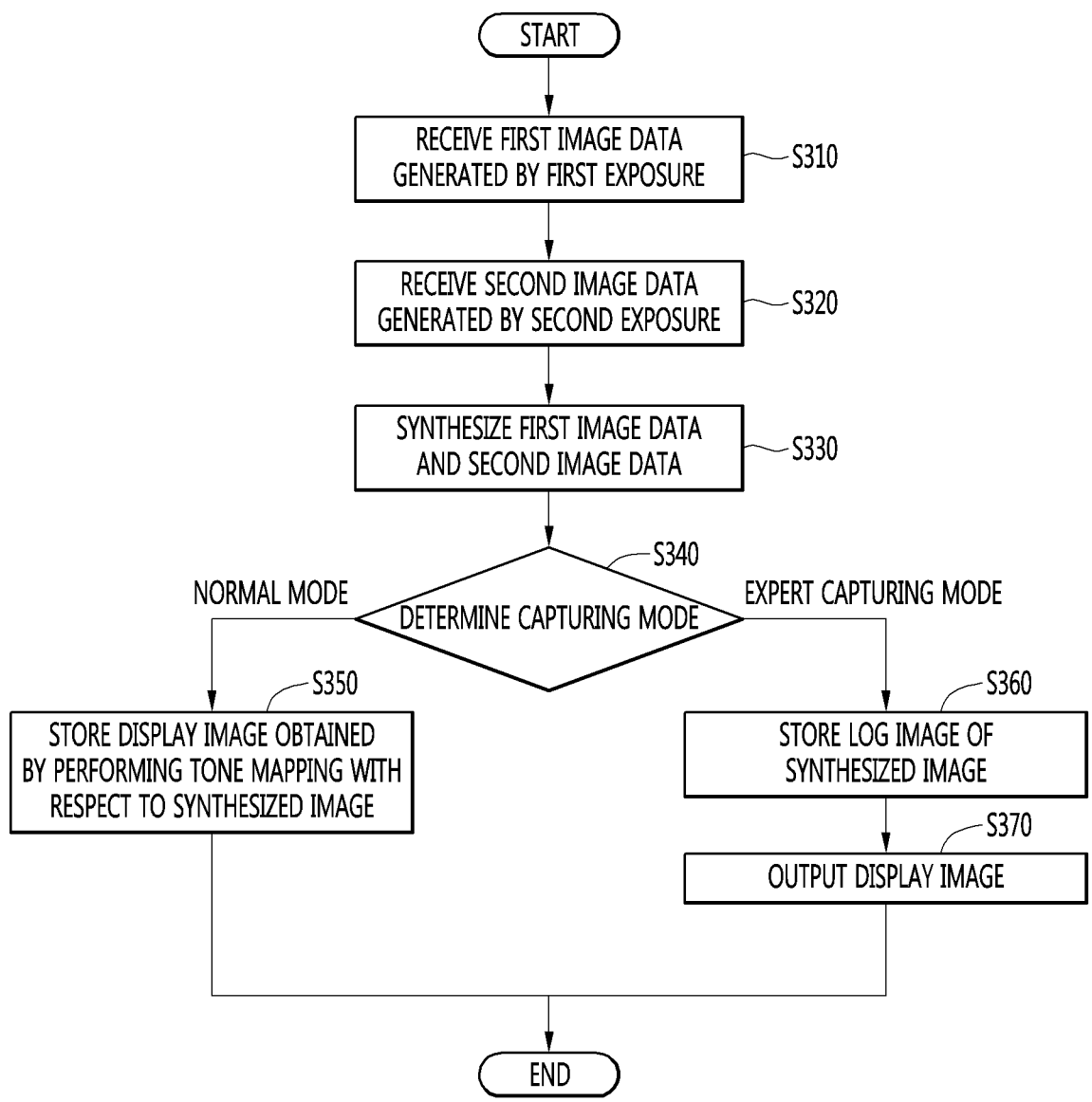
FIG. 3 is a flowchart illustrating a method of operating a mobile terminal according to an embodiment of the present invention.

Next, FIG. 3 is a flowchart illustrating a method of operating a mobile terminal according to an embodiment of the present invention. As shown, the method includes step S310 of receiving first image data generated by a first exposure, step S320 of receiving second image data generated by a second exposure, step S330 of generating synthesized image data obtained by synthesizing the first image data and the second image data, step S340 of determining a capturing mode of the mobile terminal, step S350 of storing a display image obtained by transforming the synthesized image data when the capturing mode of the mobile terminal is a third mode (normal capturing mode), step S360 of storing a log image obtained by applying a log profile to the synthesized image data when the capturing mode of the mobile terminal is a first mode (expert capturing mode), and step S370 of outputting a display image obtained by transforming a log image when the capturing mode of the mobile terminal is a second mode (cine video mode).

Figure 4:
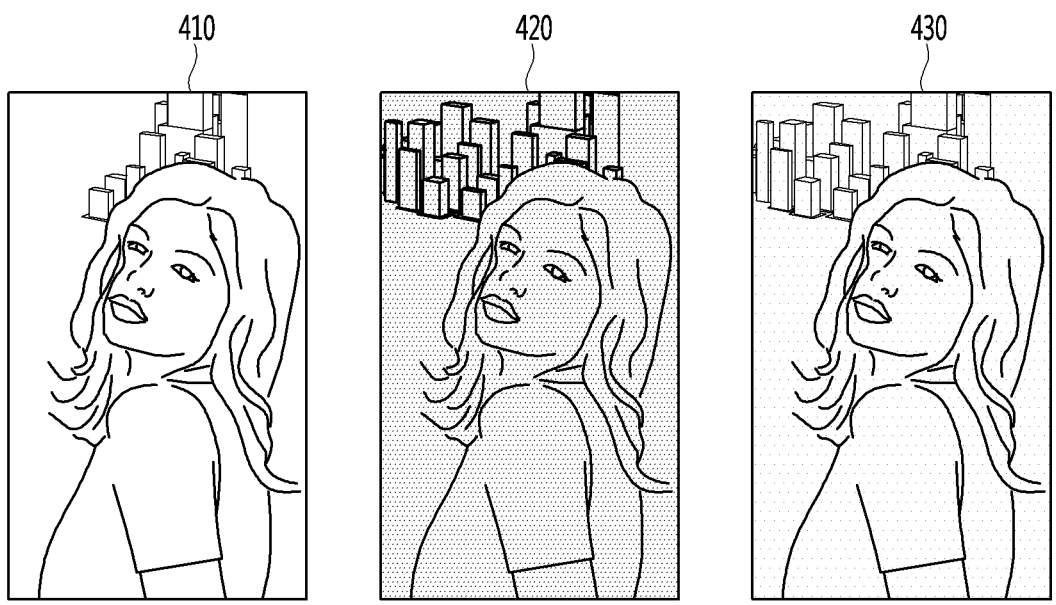
FIG. 4 is a view illustrating a method of synthesizing images according to an embodiment of the present invention.

Next, FIG. 4 is a view illustrating a method of synthesizing images according to an embodiment of the present invention. The camera 121 can apply the first exposure to perform first capturing under control of the controller 180. In this instance, the first exposure is a long exposure and an image 410 captured by the first exposure may include brightness information having a relatively high level. The camera 121 can output the first image corresponding to the captured image 410 to the controller 180.

In addition, the camera 121 can perform second capturing successively to the first capturing. Specifically, the camera 121 can apply the second exposure to perform second capturing under control of the controller 180. In this instance, the second exposure is a short exposure and an image 420 captured by the second exposure may include brightness information having a relatively low level. The camera 121 can output the second image data corresponding to the captured image 420 to the controller 180.

Further, the controller 180 can generate the synthesized image data obtained by synthesizing the first image data and the second image data. Here, an image 430 corresponding to the synthesized image data can be a synthesized image of the first image data in a dark region and a synthesized image of the second image data in a bright region.

Next, FIG. 5 is a view illustrating a method of compressing synthesized image data according to a mode of a mobile terminal 100 according to an embodiment of the present invention. As discussed above, the operation mode of the mobile terminal 100 may include the first mode which is the expert capturing mode and the third mode which is the normal capturing mode. The first mode may be a mode in which a log image acquired by applying a log profile to image data obtained by synthesizing the first image data and the second image data is stored.

Applying the log profile includes generating a log image which preserves a brightness difference of a scene by transforming information contained in the synthesized image data into a log domain. Specifically, a color profile is a definition of a relationship between light (X, Y, Z) and color (R, G, B) and, among color files, a profile whose transform function has a log type, is defined as a log file.

This is a method using characteristics in Weber's law, which is human visual characteristics, and which increases similarly to a logarithmic function. Weber's law means that human eyes can sense a slight change in brightness in a dark part but cannot sense a large change in brightness in a bright part. That is, the contrast and brightness information of an original can be preserved by applying a logarithmic function to brightness information included in synthesized image data.

For example, when the synthesized image is a 14-bit-depth image containing dynamic range information of 14 stops, as shown in FIG. 5(a), an 8-bit-depth log image including dynamic range information of 14 stops can be generated by applying a log profile whose transform function has a log type. Since the log image includes HDR information, a color tone may not be normally displayed or may be blurred. The log image can also be transmitted to an external PC, etc. and may be edited by a specialized editing program.

In the present invention, an image having restored HDR information can be generated inside (in the second mode) or outside the mobile terminal. In addition, it is possible to prevent a dynamic range from being lost in a tone mapping process. The third mode may be a mode in which synthesized image data obtained by synthesizing first image data and second image data is transformed and a display image is stored.

The display image may be an SDR image mapped to a dynamic range expressed on an SDR image output display, by tone-mapping the synthesized image data. For example, if the synthesized image is a 14-bit-depth image containing dynamic range information of 14 stops, an 8-bit-depth SDR image including dynamic range information of 10 stops can be generated, by tone-mapping the synthesized image. In FIG. 5(b), it is assumed that a curve is linear. Since the display image stored in the third mode is compressed to a dynamic range which can be expressed on an SDR image output display, some of the dynamic range information of the synthesized image data may be lost but a color tone can be normally output.

Figure 6:
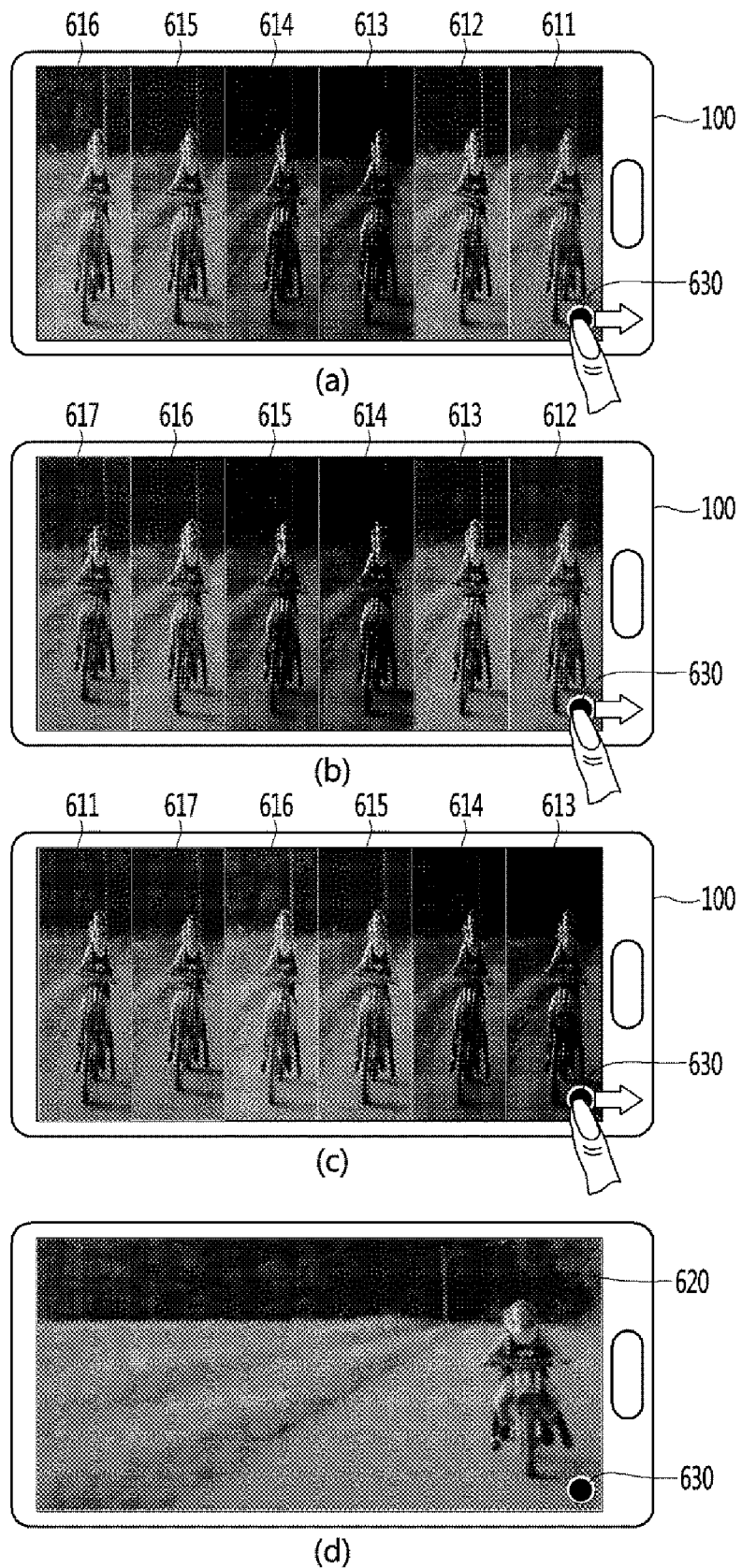
FIG. 6 is a view illustrating a method of specifying a filter in a third mode and capturing or recording an image according to an embodiment of the present invention.

Next, FIG. 6 is a view illustrating a method of specifying a filter in a third mode and capturing or recording an image according to an embodiment of the present invention. As shown, the controller 180 can display a plurality of filters 611, 612, 613, 614, 615 and 616 in the third mode. Each of the plurality of filters 611 to 616 can apply a unique color thereof to an image and correspond to a plurality of lookup tables. The lookup table is for outputting an output value by applying tone mapping and color grading to an input value.

That is, the controller 180 can perform different tone mapping and color grading according to selection of a filter by a user, by respectively applying different lookup tables to the plurality of filters. Specifically, the mobile terminal 100 may include an input unit for receiving input from a user.

In addition, when an input of selecting a first filter from among the plurality of filters 611 to 616, the controller 180 can perform tone mapping and color grading with respect to the synthesized image, by applying a first lookup table (LUT) corresponding to the first filter to the synthesized image. The controller 180 can also store a tone-mapped and color-graded image, that is, a display image, in the storage unit 170.

Further, the controller 180 can display some of the plurality of filters. For example, if the filters provided by the mobile terminal 100 is seven filters 611, 612, 613, 614, 615, 616 and 617 and the number of filters displayed on one screen is set to 6, the controller 180 can display six filters 611, 612, 613, 614, 615 and 616.

The controller 180 can also display a capturing button 630. When input of selecting the capturing button 630 is received, the controller 180 can capture an image. The controller 180 can also change the filters displayed on the screen based on input of moving the capturing button.

Specifically, when an input of moving the capturing button is received, the controller 180 can rotate the filters displayed on the screen according to the movement direction of the capturing button. For example, in FIG. 6(a), among the first filter 611, the second filter 612, the third filter 613, the fourth filter 614, the fifth filter 615, the sixth filter 616 and the seventh filter 617 provided by the mobile terminal 100, the first filter 611, the second filter 612, the third filter 613, the fourth filter 614, the fifth filter 615 and the sixth filter 616 are displayed. The capturing button is located on the first filter 611.

In this instance, when an input of touching and moving the capturing button 630 to the right is received, as shown in FIG. 6(b), the controller 180 can move the first filter to the right to generate a deletion effect, by not displaying the first filter 611. In addition, the controller 180 can move the second filter 612, the third filter 613, the fourth filter 614, the fifth filter 615 and the sixth filter 616 to the right one by one and display the filters. In addition, the controller 180 can newly display the seventh filter 617 on the left side of the sixth filter 616.

In addition, when input of touching and moving the capturing button 630 to the right is continuously maintained, as shown in FIG. 6(c), the controller 180 can move the second filter 612 to the right to generate a deletion effect, by not displaying the second filter 612. In addition, the controller 180 can move the third filter 613, the fourth filter 614, the fifth filter 615, the sixth filter 616 and the seventh filter 617 to the right one by one and display the filters. In addition, the controller 180 can newly display the first filter 611 on the left side of the seventh filter 617.

Meanwhile, when input of releasing touch of the capturing button 630 is received, as shown in FIG. 6(d), an image 620, to which a filter located in a region, in which the capturing button 630 is located is applied, can be displayed. For example, when a touch of the capturing button 630 is released in a state in which the capturing button 630 is located on the third filter 630, the controller 180 can display a preview image, to which the third filter 630 is applied.

In addition, the controller 180 can store a display image obtained by applying a lookup table corresponding to the third filter 630 to the synthesized image data. The synthesized image data is tone-mapped and color-graded with a unique color of the third filter 630 and stored in the storage unit 170.

Further, the controller 180 can receive a new filter from a server and store the new filter in the storage unit 170. Specifically, the controller 180 can receive a lookup table corresponding to the new filter from a server and store the lookup table in the storage unit 170. In this instance, the controller 180 can provide a new filter in addition to the first filter 611, the second filter 612, the third filter 613, the fourth filter 614, the fifth filter 615, the sixth filter 616 and the seventh filter 617. In the present invention, the filters can be rotated by an intuitive method of moving the capturing button even when filters cannot be displayed on one screen by continuously adding the filters.

FIG. 7 is a view illustrating a method of displaying a tone adjustment curve and adjusting a tone according to an embodiment of the present invention. When a touch input is received in a state of displaying a display image, the controller 180 can display an adjustment point 721 of the tone adjustment curve at a point where the a touch input is received.

In addition, the controller 180 can display the tone adjustment curve 711 including the adjustment point 721. The adjustment point 721 can be displayed at a point on the tone adjustment curve corresponding to the brightness information of a region in which the a touch input is received.

Specifically, the tone adjustment curve 711 can display a dark tone toward a lower left portion and display a bright tone toward an upper right portion. Regions in the image may correspond to specific points in the tone adjustment curve 711 according to brightness thereof. For example, a dark region in the image 730 may correspond to the lower left point of the tone adjustment curve 711 and a bright region in the image 730 may be located at an upper right point of the tone adjustment curve 711.

The controller 180 can first display the adjustment point 721 at a point where the touch input is received. In addition, the controller 180 can acquire brightness information of the region in which the touch input is received. When a variety of brightness is distributed in the region in which the touch input is received, the controller 180 can acquire information on a most widely distributed brightness.

As discussed above, the tone adjustment curve 711 includes the adjustment point 721, and the controller 180 can display the tone adjustment curve 711 such that the adjustment point 721 is located at a point on the tone adjustment curve 711 corresponding to the brightness of the region in which the touch input is received.

When input of changing the position of the adjustment point 721 is received after displaying the tone adjustment curve 711, the controller 180 can change the shape of the curve based on change in position of the adjustment point 722. For example, when the user touches and drags down the adjustment point 721, the controller 180 can display a changed second adjustment point 722 at a position where dragging ends and display a second curve 722, the shape of which is changed to include the second adjustment point 722.

That is, the curve 712 may be bent or unfolded according to change in position of the adjustment point 721. The controller 180 can also adjust the tone of the display image 730 according to the change in shape of the tone adjustment curve 711. For example, when the adjustment point 721 corresponds to a specific brightness and the adjustment point 721 is moved down, a region having the specific brightness in the image 730 can be changed to a dark tone.

As another example, when the adjustment point 721 corresponds to specific brightness and the adjustment point 721 is moved up, a region having the specific brightness in the image 730 can be changed to a bright tone. In addition to the change of the tone of the region having the specific brightness, the tone of the region having another brightness can also be changed according to the change of the tone adjustment curve 711.

For example, when the tone adjustment curve 711 is changed to a second tone adjustment curve 712 according to change of the adjustment point 721 and a specific point located on a lower left end of the adjustment point 721 on the tone adjustment curve 711 is further moved down on the second tone adjustment curve 712, a region having brightness corresponding to the specific point can be changed to a dark tone.

Therefore, the present invention provides an environment in which the user can directly select a region in which tone adjustment is required and adjust a tone. In addition, since the adjustment point is displayed at a position corresponding to the brightness of a touch point, the user can change the tone around the region in which tone adjustment is required.

Figure 8:
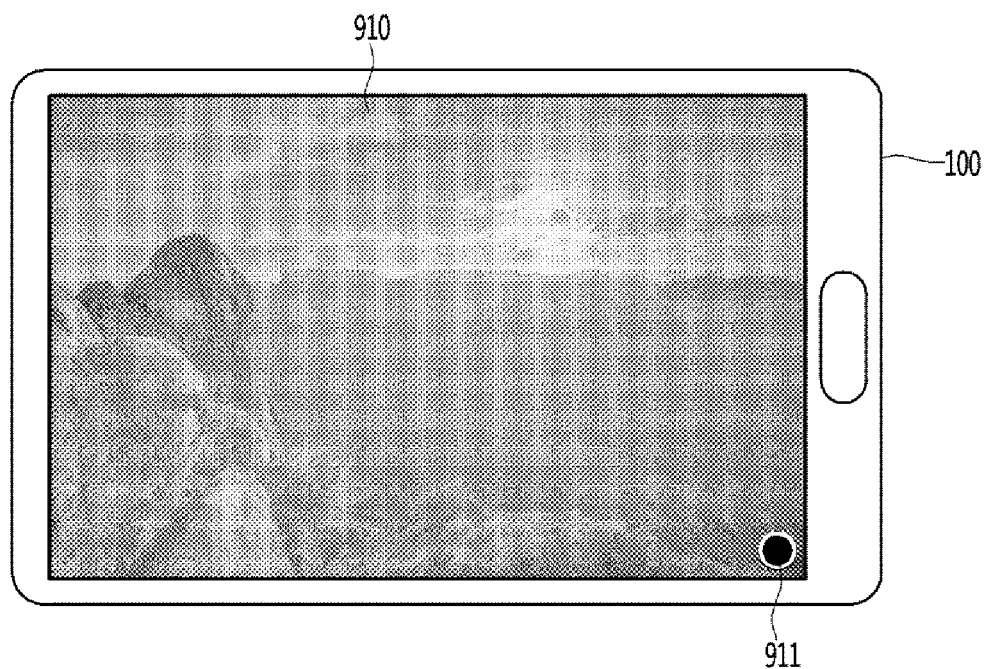
FIGS. 8 to 9 are views illustrating a method of displaying a log image in a first mode according to an embodiment of the present invention.
Figure 9:
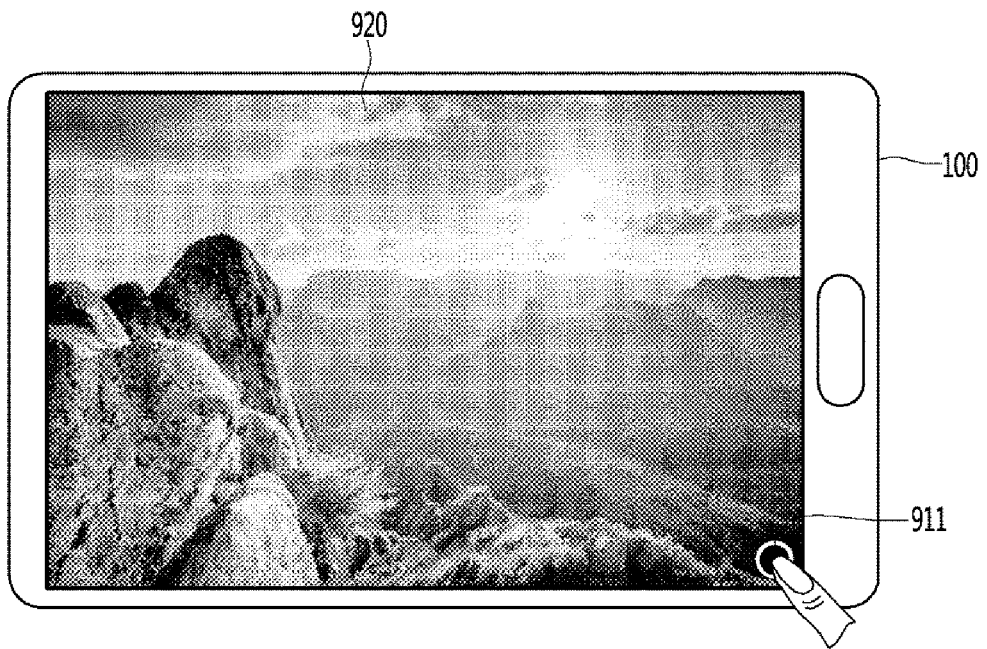

Next, FIGS. 8 to 9 are views illustrating a method of displaying a log image in a first mode according to an embodiment of the present invention. In the first mode, as shown in FIG. 8, the controller 180 can display a log image 910 on a preview screen. The log image 910 may be a log video. That is, the controller 180 can generate synthesized image data per frame and apply a log profile to the synthesized image data, thereby outputting the log video.

Since the log image 910 includes an HDR image but is not tone-mapped and color-graded, the color tone may not be normally displayed or may be blurred. When an input of touching a button 911 on the preview screen is received, as shown in FIG. 9, the controller 180 can output a display image 920 obtained by transforming the log image 910.

Specifically, the controller 180 can display the display image 920 obtained by performing tone mapping and color grading with respect to the log image 910. Since the display image 920 is an SDR image displayed on a HDR image output display, the color tone of the image may be normally expressed. When input of releasing touch of the button 911 is received, the controller 180 can output the log image 910 again.

That is, while touch of the button 911 is maintained, a display image having a normal color tone can be output by tone-mapping and color-grading the log image 910 and, when the button 911 is not touched, the log image can be output without being tone-mapped and color-graded.

Further, the log image 910 and the display image 920 are displayed on the preview screen and may not be stored in the storage unit 170. When an input of storing the log image 910 is received, the controller 180 can store the log image. In this instance, the controller 180 can store the log image 910 in the storage unit 170, regardless of whether the button 911 is touched or not.

Specifically, when the button 911 is not touched, the log image 910 can be displayed on the preview image and the controller 180 can store the log image in the storage unit 170. In addition, when an input of touching the button 911 is received, the display image 920 is displayed on the preview screen. However, even in this instance, the controller 180 can store the log image in the storage unit 170.

In the present invention, even when log capturing is performed and the log image is stored, log capturing can be performed while checking the image when color processing is performed.

The present embodiment is also applicable to when a pre-stored log image is displayed, in addition to the preview screen. Specifically, when an input of displaying the log image stored in the storage unit 170 is received, the controller 180 can display the log image. In this instance, when a touch of the button 911 is maintained, the log image 910 is tone-mapped and color-graded, thereby outputting a display image having a normal color tone. When the button 911 is not touched, the log image 910 can be output without being tone-mapped and color-graded.

Figure 10:
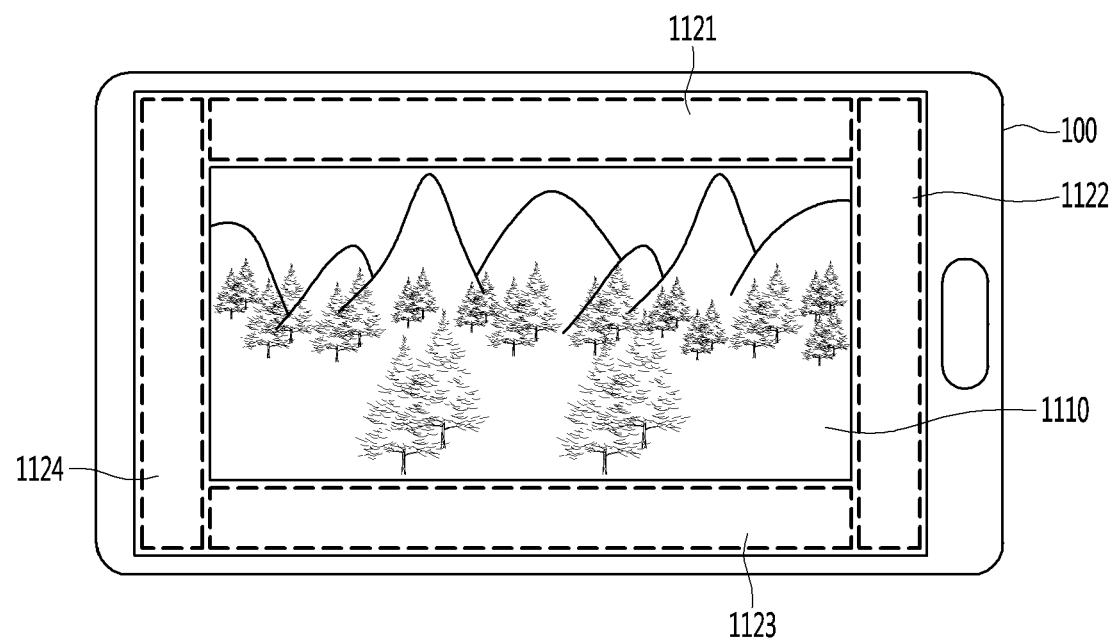
FIG. 10 is a view illustrating a preview image when an expert mode is selected according to an embodiment of the present invention.

Next, FIG. 10 is a view illustrating a preview image when an expert mode is selected according to an embodiment of the present invention. When the expert mode is selected, the controller 180 can display a log image 1110 on a preview screen.

In addition, the controller 180 can display a plurality of menus 1121, 1122, 1123 and 1124 selectable upon shooting a video along with the log image 1110. The first menu 1121 may include a button capable of selecting any one of wide-angle capturing or normal-angle capturing. In addition, the second menu 1122 may include a photographing button, a video shooting button and a gallery button. In addition, the third menu 1123 may include manual adjustment buttons for shutter speed, sensitivity (ISO) and white balance. In addition, the fourth menu 1124 may include a front-and-rear shooting switch button, a flash and a setting button.

Figure 11:
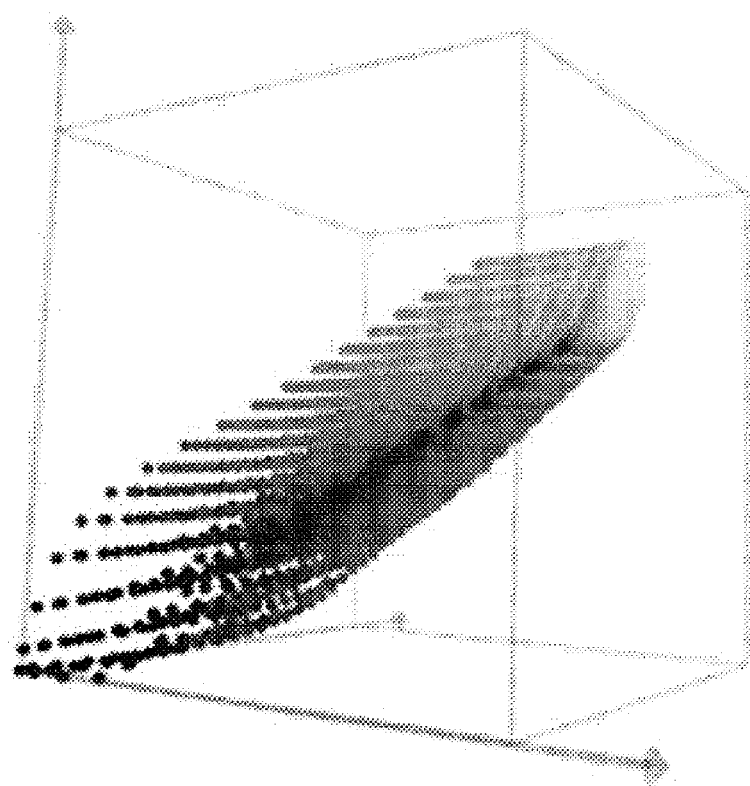
FIG. 11 is a view illustrating a method of changing a lookup table based on brightness change according to an embodiment of the present invention.

Next, FIG. 11 is a view illustrating a method of changing a lookup table based on a brightness change according to an embodiment of the present invention. The controller 180 can apply a 3D lookup table to a log image to output a display image subjected to tone mapping and color grading in a second mode or apply a 3D lookup table to a display image compressed into an SDR image to output a display image subjected to color grading in a third mode.

In this instance, the controller 180 can apply a 3D lookup table to one image to output a display image, based on the default setting of the mobile terminal 100 or user selection. The present invention is not limited thereto and the controller 180 can apply a plurality of 3D lookup table to one image to output a display image, based on an average brightness of synthesized image data.

Specifically, the plurality of 3D lookup tables corresponding to a plurality of average brightnesses may be stored in the storage unit 170. In addition, the controller 180 can acquire information on a current average brightness of synthesized image data, read the 3D lookup table corresponding to the current average brightness from the storage unit 170, and apply the 3D lookup table to the synthesized image data. Thus, the present invention prevents a color drift when the entire brightness is changed and can maintain a color similar to a first color even when the brightness is decreased or increased.

FIG. 12 is a view illustrating a method of applying a filter in a second mode according to an embodiment of the present invention. The second mode may be a cine video mode in which the log image is compressed and output on an SDR image output display. When an input of selecting a cine video mode is received, the controller 180 can output a display image obtained by transforming the log image.

Specifically, the controller 180 can apply a lookup table to the log image to display a display image subjected to tone mapping and color grading. However, an image first displayed upon selecting the cine video mode may be an image 1110, to which a default lookup table is applied. The default lookup table may be a lookup table for applying tone mapping to the log image without color grading.

That is, when an input of selecting the cine video mode is received, the controller 180 can apply the default lookup table to the log image to output a display image subjected to tone mapping. The controller 180 can also display a plurality of filters 1121, 1122, 1123 and 1124 along with the tone-mapped image 1110.

The plurality of filters 1121, 1122, 1123 and 1124 can apply unique colors thereof to the image. The plurality of filters 1121, 1122, 1123 and 1124 may correspond to the plurality of lookup tables, respectively. The lookup table may perform tone mapping and color grading with respect to an input value to output an output value.

The controller 180 can perform different tone mapping and color grading according to selection of a filter by the user, by respectively applying different lookup tables to the plurality of filters. Specifically, when an input of selecting the second filter 1122 from among the plurality of filters 1121, 1122, 1123 and 1124 is received, the controller 180 can apply a second lookup table corresponding to the second filter 1122 to the log image, thereby displaying a display image 1130 obtained by performing tone mapping and color grading with respect to the log image.

Currently, the log image is mainly used by experts. This mobile terminal provides an environment in which the user can easily color and change the log image. In addition, in the present invention, since the log image is stored and LUT processing is performed using the log image, an image containing HDR information can be output.

Figure 13:
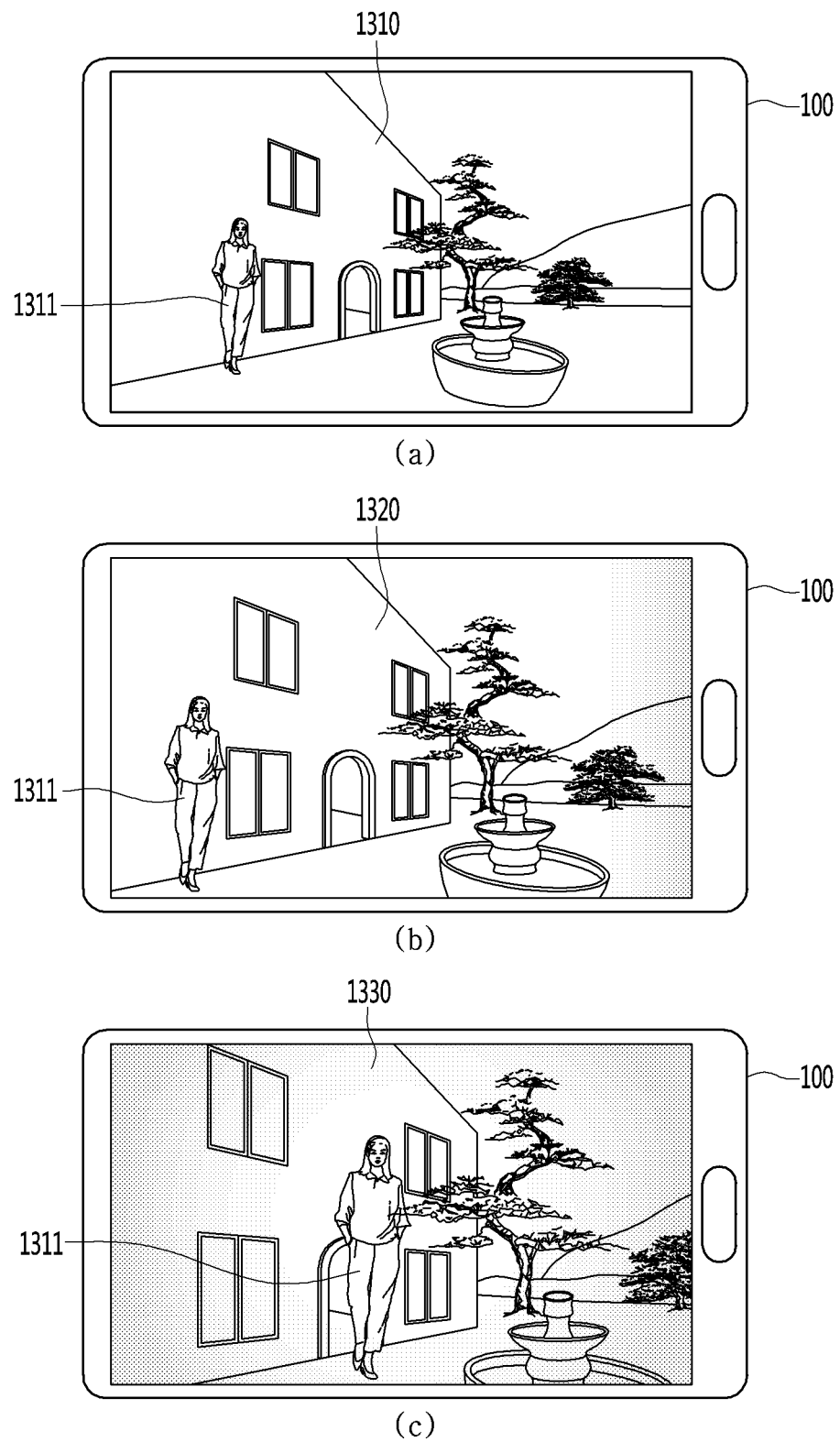
FIG. 13 is a view illustrating a method of applying a vignette effect according to an embodiment of the present invention.

Next, FIG. 13 is a view illustrating a method of applying a vignette effect according to an embodiment of the present invention. The controller 180 can output a display image, to which a vignette effect is applied. The vignette effect means that the brightness of the periphery of a subject is lowered.

The controller 180 can apply the vignette effect to a subject 1311. In particular, the subject 1311 is an object which should be most expressive in an image and may include, for example, a person. The controller 180 can adjust at least one of the position, size and intensity of the vignette effect based on the movement direction of the subject 1311.

For example, the controller 180 can acquire information on left-and-right movement direction of the subject 1311 based on the position of the subject 1311. In addition, the controller 180 can also move a region, to which the vignette effect is applied, according to the movement direction of the subject 1311.

As another example, the controller 180 can acquire information on forward-and-backward movement direction of the subject based on the size of the subject 1311. In addition, the controller 180 can adjust the size or intensity of the vignette effect according to the movement direction of the subject. The controller 180 can also apply the vignette effect to the log image and output the log image, to which the vignette effect is applied. Further, the controller 180 can output a display image obtained by performing tone mapping and color grading with respect to the log image, to which the vignette effect is applied.

The controller 180 can acquire information on weather, color distribution of a current scene, etc. based on a preview image. When an input of capturing an image is received, the controller 180 can automatically set an exposure based on the information on weather, color distribution of a current scene, etc.

In addition, the controller 180 can acquire information on weather, color distribution of a current scene, etc. using the captured image. In this instance, the controller 180 can display an image, to which the vignette effect such as a horizontal, vertical, diagonal or random effect is automatically applied, based on the information on weather, color distribution of a current scene, etc.

When an image is captured, the controller 180 can store exposure information or filter information applied upon capturing the image along with the image. In addition, the controller 180 can acquire and store information on the composition of the image, weather, color distribution, etc. Therefore, the controller 180 can determine what is the user's favorite exposure information or filter information in correspondence with the composition of the image, weather, color distribution, etc.

In addition, the controller 180 can apply user's favorite exposure information to capture an image based on the composition of a preview image, weather, color distribution, etc. In addition, when a specific image is displayed, the controller 180 can apply the user's favorite filter to the specific image based on the composition of the specific image, weather, color distribution, etc. and display the specific image.

Figure 14:
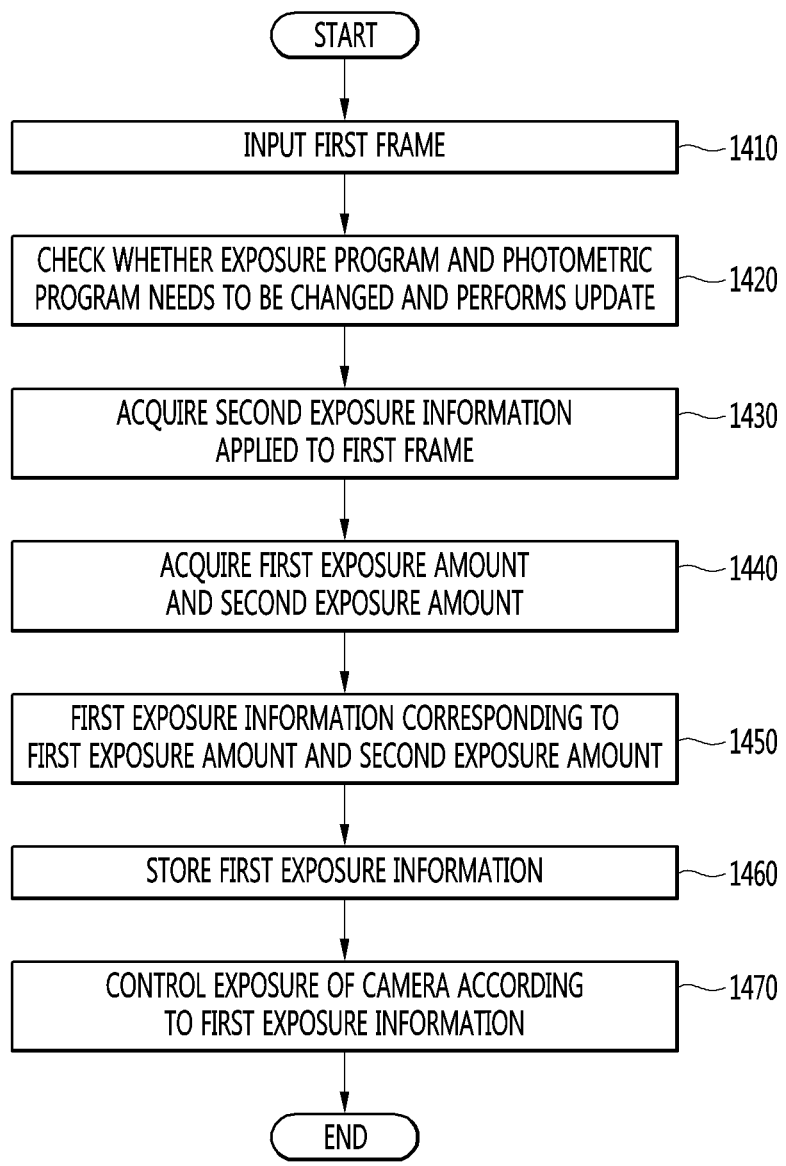
FIG. 14 is a flowchart illustrating an exposure control method of a camera according to an embodiment of the present invention.

Next, FIG. 14 is a flowchart illustrating an exposure control method of a camera according to an embodiment of the present invention. In FIG. 14, the exposure control method includes step S1410 of receiving first image data of a first frame generated by a first exposure from an image sensor, receiving second image data of the first frame generated by a second exposure from the image sensor and generating synthesized image data of the first frame obtained by synthesizing the first image data of the first frame and the second image data of the first frame, step S1420 of acquiring information indicating whether an exposure program or a photometric program needs to be changed, step S1430 of acquiring second exposure information applied to the first frame, step S1440 of acquiring first absolute brightness using average brightness information of the image data of the first frame and second exposure information and acquiring second absolute brightness using maximum brightness information of the image data of the first frame and the second exposure information, step S1450 of acquiring first exposure information corresponding to the first absolute brightness and the second absolute brightness, step S1460 of storing the first exposure information, and step S1470 of controlling the first exposure and the second exposure based on the first exposure information.

Figure 15:
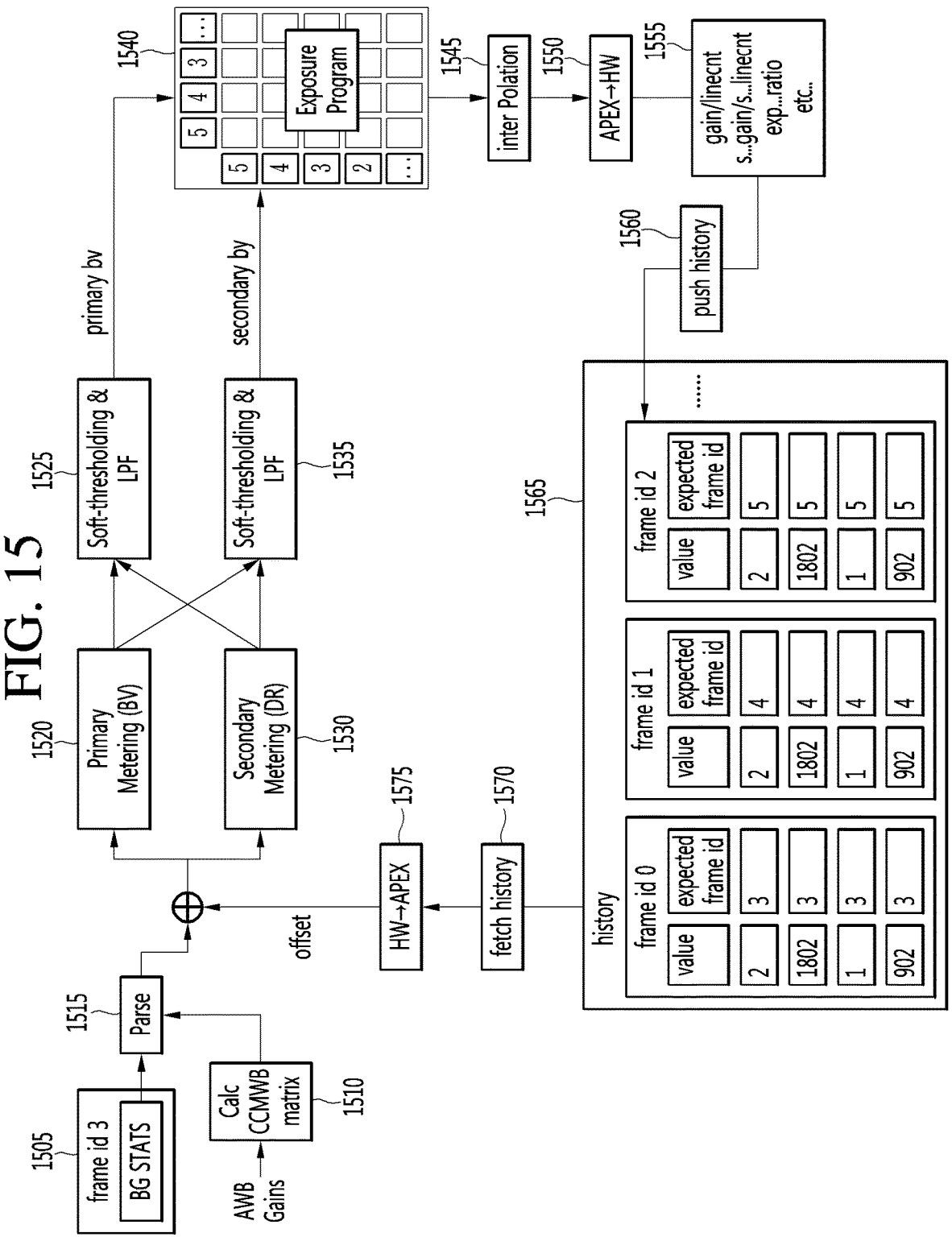
FIG. 15 is a block diagram illustrating an exposure control method of a camera according to an embodiment of the present invention.

FIG. 15 is a block diagram illustrating an exposure control method of a camera according to an embodiment of the present invention. The below-described blocks are divided in order to explain each function step by step and the functions performed by the following blocks can be performed by the controller 180.

The synthesized image data of the first frame obtained by synthesizing the first image data of the first frame generated by the first exposure and the second image data of the first frame generated by the second exposure may be input to a first block 1505. In this instance, the first block 1505 can output a sensor signal stats including brightness information of the synthesized image data of the first frame.

The synthesized image of the first frame corresponding to the synthesized image data of the first frame can then be divided into a plurality of grids. A third block 1515 can acquire average brightness information of the plurality of grids. For example, the third block 1515 can acquire and output a plurality of pieces of log brightness information obtained by modifying the average brightness information of the plurality of grids to a log domain.

A fourth block 1520 can acquire a first absolute brightness based on the average brightness information of the synthesized image data of the first frame and second exposure information applied to the first frame. The second exposure information applied to the first frame may mean a setting applied to the camera 151 when the image of the first frame is captured.

For example, when the first image data of the first frame is generated by capturing the image by the first exposure, the second image data of the first frame is generated by capturing the image by the second exposure and the synthesized image data of the first frame is generated by synthesizing the first image data and the second image data, the second exposure information may include a sensitivity of the first exposure, an exposure time of the first exposure, a sensitivity of the second exposure and an exposure time of the second exposure.

The first absolute brightness may be used interchangeably with Primary Bv. Primary Bv is responsible for basic exposure targeting balanced distribution. A fourth block 1520 may acquire first absolute brightness based on average brightness information of the synthesized image data of the first frame, sensitivity of the first exposure applied to the first frame and an exposure time of the first exposure applied to the first frame.

Specifically, the fourth block 1520 can acquire log sensitivity information Sv obtained by modifying the sensitivity S of the first exposure to a log domain. In addition, the fourth block 1520 can acquire log time information Tv obtained by modifying the exposure time T of the first exposure to a log domain.

In addition, the fourth block 1520 can acquire average brightness information x of the synthesized image of the first frame based on the average brightness information of the plurality of grids and acquire average log brightness information $\log_2 x$ obtained by modifying the average brightness information x of the synthesized image of the first frame to a log domain.

In this instance, the fourth block 1520 can acquire first absolute brightness information By based on the average log brightness information $\log_2 X$, log sensitivity information Sv of the first exposure, and log time information Tv of the first exposure. That is, information on the absolute brightness of an external environment can be acquired by adding sensitivity and the exposure time to the average brightness information of the image as an offset.

The above-described processes may be expressed by the following equations.

$$x = a\frac{BST}{A^2} \qquad \text{Equation 1}$$

where, a and A (aperture) may be constants.

$$\log_2 X = \log_2 a + \log_2 B + \log_2 S + \log_2 T - 2\log_2 A \qquad \text{Equation 2}$$

$$\log_2 X = \log_2 Ka + B_v + S_v - T_v - A_v \qquad \text{Equation 3}$$

$$\left(A_v = 2\log_2 A,\ S_v = \log_2 NS,\ T_v = -\log_2 T,\ B_v = \log_2\left(\frac{B}{NK}\right)\right)$$

$$B_v = A_v + T_v - S_v + \log_2 \frac{X}{Ka} \qquad \text{Equation 4}$$

$$B_v = \log_2 X + \text{Offset},\ \text{Offset} = A_v + T_v - S_v - \log_2 Ka \qquad \text{Equation 5}$$

The second absolute brightness can be acquired by a similar method.

Specifically, a sixth block 1530 can acquire a second absolute brightness based on a maximum brightness of the synthesized image data of the first frame and second exposure information applied to the first frame. The second absolute brightness can be used interchangeably with Secondary Bv. Secondary Bv extends a dynamic range.

The second exposition information applied to the first frame may mean a setting applied to the camera 151 when the image of the first frame is captured. For example, when the first image data of the first frame is generated by capturing the image by the first exposure, the second image data of the first frame is generated by capturing the image by the second exposure and the synthesized image data of the first frame is generated by synthesizing the first image data and the second image data, the second exposure information may include sensitivity of the first exposure, an exposure time of the first exposure, sensitivity of the second exposure and an exposure time of the second exposure.

A sixth block 1530 can acquire second absolute brightness based on maximum brightness information of the synthesized image data of the first frame, a sensitivity of the second exposure applied to the first frame and an exposure time of the second exposure applied to the first frame, to which Equations 1 to 5 are applicable without change. Specifically, the sixth block 1530 can acquire log sensitivity information Sv obtained by modifying sensitivity S of the second exposure to a log domain. In addition, the fourth block 1520 can acquire log time information Tv obtained by modifying an exposure time T of the second exposure to a log domain.

In addition, the sixth block 1530 can acquire average brightness information of a grid having a highest average brightness among the plurality of grids as maximum brightness information x based on the average brightness information of the plurality of grids. In addition, the sixth block 1530 can acquire maximum log brightness information $Log_2$ x obtained by modifying the maximum brightness information x to a log domain.

In this instance, the sixth block 1530 can acquire second absolute brightness information By based on the maximum log brightness information $Log_2$ X, log sensitivity information Sv of the second exposure and log time information Tv of the second exposure. That is, information on absolute brightness of an external environment can be acquired by adding a sensitivity and an exposure time to the maximum brightness information of the image data as an offset.

Although the first absolute brightness information By is acquired by first obtaining the average log brightness information $Log_2$ X of the plurality of grids and adding an offset, the present invention is not limited thereto. Specifically, the fourth block 1520 can acquire log sensitivity information Sv obtained by modifying sensitivity S of the first exposure to a log domain. In addition, the fourth block 1520 can acquire log time information Tv obtained by modifying an exposure time T of the first exposure to a log domain.

Also, the fourth block 1520 can acquire log brightness information $Log_2$ x obtained by modifying the average brightness information of the plurality of grids to a log domain. In this instance, the fourth block 1520 can acquire the absolute brightness information of each of the plurality of grids based on the log brightness information $Log_2$ x of each of the plurality of grids, log sensitivity information Sv of the first exposure and log time information Tv of the first exposure. In addition, the fourth block 1520 can acquire first absolute brightness information obtained by averaging the absolute brightness information of the plurality of grids.

Although the second absolute brightness information By is acquired by first obtaining the maximum log brightness information $Log_2$ X and adding an offset, the present invention is not limited thereto. Specifically, the sixth block 1530 can acquire log sensitivity information Sv obtained by modifying sensitivity S of the second exposure to a log domain. In addition, the sixth block 1530 can acquire log time information Tv obtained by modifying an exposure time T of the second exposure to a log domain.

In addition, the sixth block 1530 can acquire log brightness information $Log_2$ x obtained by modifying the average brightness information of the plurality of grids to a log domain. In this instance, the sixth block 1530 can acquire the absolute brightness information of each of the plurality of grids based on the log brightness information $Log_2$ x of each of the plurality of grids, log sensitivity information Sv of the second exposure and log time information Tv of the second exposure. In addition, the sixth block 1530 can acquire the absolute brightness information of a grid having highest brightness as second absolute brightness information based on the absolute brightness information of each of the plurality of grids.

Also, each of the fifth block 1525 and the seventh block 1535 may include a low pass filter (LPF), thereby removing noise. Each of the fifth block 1525 and the seventh block 1535 can also stabilize error or shaking of the first absolute brightness and the second absolute brightness. In addition, the fifth block 1525 and the seventh block 1535 can decrease an exposure change speed when an exposure difference is small, and increase the exposure change speed when the exposure difference is large, thereby rarely causing exposure change when the exposure difference is very small.

An eighth block 1540 can acquire first exposure information corresponding to the first absolute brightness and the second absolute brightness. Specifically, the storage unit 170 can store a lookup table including a plurality of pieces of exposure information. This will be described with reference to FIGS. 16 to 17. The lookup table includes a plurality of pieces of exposure information.

Further, one piece of exposure information may correspond to two exposure lines. The two exposure lines may include a first exposure line including a plurality of absolute brightnesses related to average brightness information and a second exposure line including a plurality of absolute brightnesses related to a maximum brightness information. That is, one piece of exposure information may correspond to one of the plurality of absolute brightnesses related to the average brightness information and correspond to one of the plurality of absolute brightnesses related to the maximum brightness information.

Figure 16:
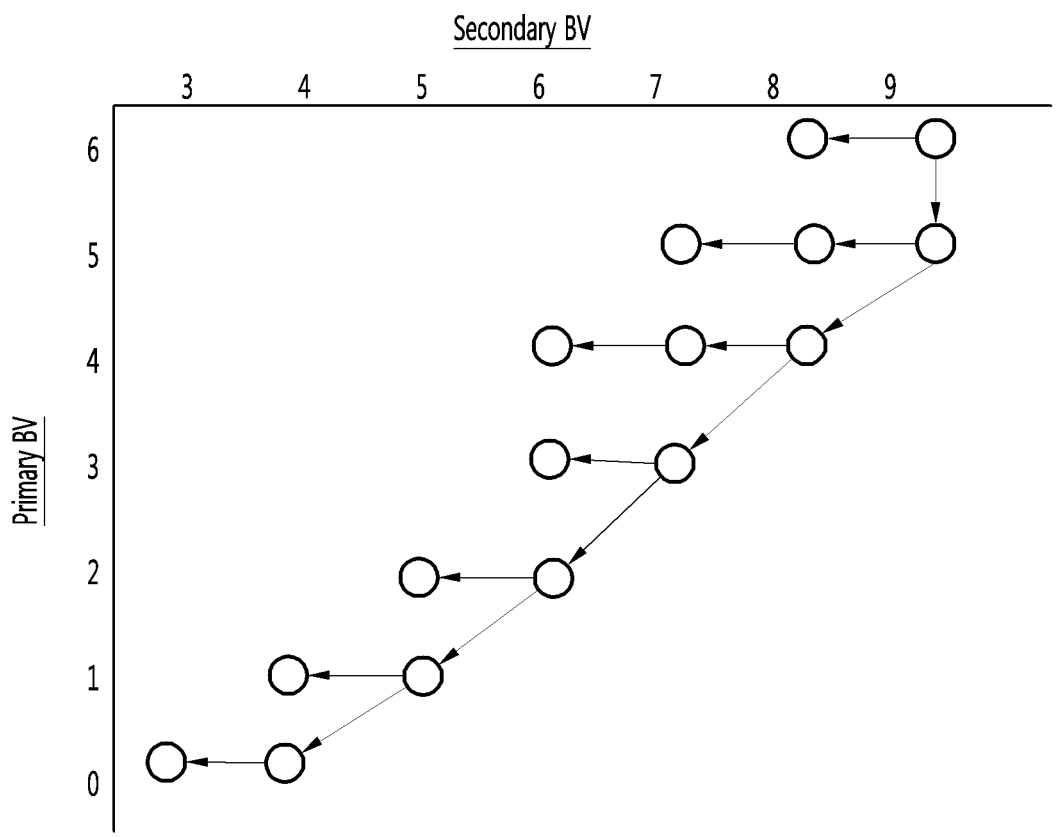
FIGS. 16 to 17 are views illustrating an exposure information table having two exposure lines according to an embodiment of the present invention.
Figure 17:
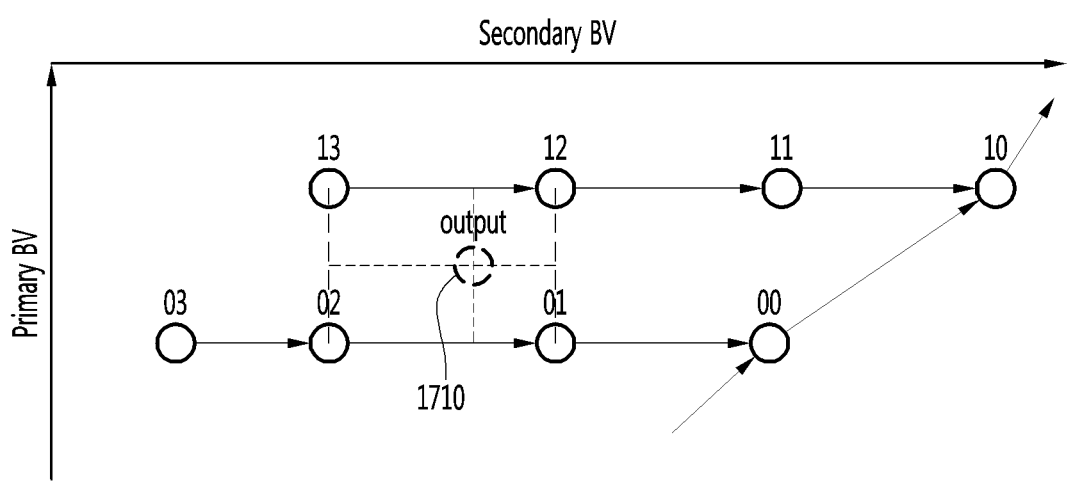

For example, referring to FIG. 16, the plurality of absolute brightnesses 0, 1, 2, 3, 4, 5 and 6 related to the average brightness information can be vertically arranged and the plurality of absolute brightnesses 3, 4, 5, 6, 7, 8 and 9 related to the maximum brightness information can be horizontally arranged in the table. In addition, the first exposure information may correspond to the third brightness 2 of the plurality of absolute brightnesses 0, 1, 2, 3, 4, 5 and 6 related to the average brightness and correspond to the fifth brightness 7 of the plurality of absolute brightnesses 3, 4, 5, 6, 7, 8 and 9 related to the maximum brightness information.

As another example, the second exposure information may correspond to the first brightness 0 of the plurality of absolute brightnesses 0, 1, 2, 3, 4, 5 and 6 related to the average brightness and correspond to the second brightness 4 of the plurality of absolute brightnesses 3, 4, 5, 6, 7, 8 and 9 related to the maximum brightness information. When the first absolute brightness and the second absolute brightness are acquired, the eighth block 1540 can acquire first exposure information from the plurality of pieces of exposure information in the table. The first exposure information may correspond to the first absolute brightness of the plurality of absolute brightnesses related to the average brightness information and correspond to the second absolute brightness of the plurality of absolute brightnesses related to the maximum brightness information.

For example, if the first absolute brightness is 4 and the second absolute brightness is 8, the eighth block 1540 can acquire first exposure information from the plurality of pieces of exposure information. The first exposure information may correspond to 4 of the plurality of absolute brightnesses related to the average brightness information and correspond to 8 of the plurality of absolute brightnesses related to the maximum brightness information.

In addition, elements of the plurality of pieces of exposure information may be stored in the form of a log domain. Although the first absolute brightness and the second absolute brightness are acquired, the same value as the first absolute brightness may not be present in the table or the same value as the second absolute brightness may not be present in the table.

In this instance, a ninth block 1545 can acquire exposure information corresponding to the first absolute brightness and the second absolute brightness using linear interpolation. Specifically, the plurality of absolute brightnesses 0, 1, 2, 3, 4, 5 and 6 related to the average brightness information can be vertically arranged and the plurality of absolute brightnesses 3, 4, 5, 6, 7, 8 and 9 related to the maximum brightness information can be horizontally arranged, in the table.

In addition, the ninth block 1545 can sum the exposure information corresponding to nodes 01, 02 and 12 and 13 adjacent to a node 1710 corresponding to the first absolute brightness and the second absolute brightness to acquire the exposure information corresponding to the first absolute brightness and the second absolute brightness. For example, referring to FIG. 17, although the first absolute brightness and the second absolute brightness are acquired, the exposure information corresponding to the first absolute brightness and the second absolute brightness is not present. Also, a point corresponding to the first absolute brightness and the second absolute brightness is expressed as a first node 1710.

Further, four nodes 01, 02, 12 and 13 are adjacent to the first node 1710 corresponding to the first absolute brightness and the second absolute brightness. The four nodes may correspond to four pieces of exposure information, respectively. In this instance, the ninth block 1545 may search for adjacent nodes. In addition, the ninth block 1545 can sum and average the exposure information corresponding to the four adjacent nodes, thereby acquiring the exposure information corresponding to the first absolute brightness and the second absolute brightness.

The plurality of pieces of exposure information may include sensitivity of the first exposure (long exposure), an exposure time of the first exposure (long exposure), sensitivity of the second exposure (short exposure) and an exposure time of the second exposure (short exposure). In addition, since the elements of the plurality of pieces of exposure information, that is, the sensitivity of the first exposure (long exposure), the exposure time of the first exposure (long exposure), the sensitivity of the second exposure (short exposure) and the exposure time of the second exposure (short exposure), are stored in a log domain, the exposure information corresponding to the first absolute brightness and the second absolute brightness can be acquired by summing and averaging the exposure information.

A tenth block 1550 can transform the elements in the form of a log domain included in the exposure information into a format recognizable by an image sensor. An eleventh block 1555 can acquire elements transformed into the format recognizable by the image sensor. That is, the eleventh block 1555 can acquire the sensitivity of the first exposure (long exposure), the exposure time of the first exposure (long exposure), the sensitivity of the second exposure (short exposure) and the exposure time of the second exposure (short exposure), which are the elements of the first exposure information corresponding to the first absolute brightness and the second absolute brightness.

In addition, the eleventh block 1555 can acquire information on an extension range of a dynamic range. Specifically, the eleventh block 1555 can acquire information on the extension range of the dynamic range based on the first absolute brightness and the second absolute brightness. Specifically, the eleventh block 1555 can acquire information on the extension range of the dynamic range based on a difference between the first absolute brightness and the second absolute brightness.

For example, the first absolute brightness and the second absolute brightness may be in the form of a log domain. Accordingly, if the first absolute brightness is 6 and the second absolute brightness is 8, a difference between the first absolute brightness and the second absolute brightness may be $2^2=4$. In this instance, the eleventh block 1555 can extend the dynamic range by two bits and determine that the first exposure as long exposure is four times the second exposure as short exposure. That is, a product of the exposure time and sensitivity of the first exposure may be four times a product of the exposure time and sensitivity of the second exposure. The synthesized image data acquired by extension may include dynamic range information of 12-bit depth.

As another example, if the first absolute brightness is 5 and the second absolute brightness is 9, a difference between the first absolute brightness and the second absolute brightness may be $2^4=16$. In this instance, the eleventh block 1555 can extend the dynamic range by four bits and determine that the first exposure as long exposure is 16 times the second exposure as short exposure. That is, a product of the exposure time and sensitivity of the first exposure may be 16 times a product of the exposure time and sensitivity of the second exposure. The synthesized image data acquired by extension may include dynamic range information of 14-bit depth.

The controller 180 can control the first exposure and the second exposure based on the first exposure information corresponding to the first absolute brightness and the second absolute brightness. Specifically, the controller 180 can control the first exposure based on the exposure time of the first exposure and sensitivity of the first exposure included in the first exposure information. In addition, the controller 180 can control the second exposure based on the exposure time of the second exposure and exposure sensitivity of the second exposure included in the first exposure information.

Table 1 shows the elements included in the plurality of pieces of exposure information.

TABLE 1

| | First exposure | | Second exposure | | Brightness difference |
|---|---|---|---|---|---|
| #1-1 | v = 4.0 | t = 1.0/120 | v = 1.0 | t = 1.0/480 | 4 stop |
| #1-2 | v = 4.0 | t = 1.0/120 | v = 1.0 | t = 1.0/120 | 2 stop |
| #1-3 | v = 4.0 | t = 1.0/120 | v = 2.0 | t = 1.0/120 | 1 stop |
| #2-1 | v = 4.0 | t = 1.0/120 | v = 1.0 | t = 1.0/480 | 4 stop |
| #2-2 | v = 4.0 | t = 1.0/120 | v = 1.0 | t = 1.0/120 | 2 stop |
| #2-3 | v = 4.0 | t = 1.0/120 | v = 2.0 | t = 1.0/120 | 1 stop |
| #2-4 | v = 2.0 | t = 2.0/120 | v = 1.0 | t = 2.0/120 | 1 stop |
| #3-1 | v = 6.0 | t = 1.0/120 | v = 1.0 | t = 3.0/960 | 4 stop |
| #3-2 | v = 6.0 | t = 1.0/120 | v = 1.0 | t = 1.0/120 | |
| #3-3 | v = 6.0 | t = 1.0/120 | v = 2.0 | t = 1.0/120 | |
| #3-4 | v = 3.0 | t = 2.0/120 | v = 1.0 | t = 2.0/120 | |
| #3-5 | v = 3.0 | t = 2.0/120 | v = 1.5 | t = 2.0/120 | 1 stop |

1-1, #1-2 and #1-3 may be equal in terms of the first absolute brightness. In addition, #1-1, #1-2 and #1-3 may be different in terms of the second absolute brightness. For example, the first absolute brightness of #1-1 may be 4 and the second absolute brightness of #1-1 may be 8. Since the first absolute brightness and the second absolute brightness are in a log domain, the difference between the first absolute brightness and the second absolute brightness may be 16 times.

In this instance, the controller 180 can determine that the first exposure as long exposure is 16 times the second exposure as a short exposure. That is, the controller 180 can control the first exposure such that the sensitivity of the first exposure is 4.0 and the exposure time of the first exposure is 1.0/120. In addition, the controller 180 can control the second exposure such that the sensitivity of the second exposure is 1.0 and the exposure time of the second exposure is 1.0/480. In this instance, a product of the exposure time and sensitivity of the first exposure may be 16 times a product of the exposure time and sensitivity of the second exposure.

As another example, the first absolute brightness of #1-3 may be 4 and the second absolute brightness of #1-3 may be 5. Since the first absolute brightness and the second absolute brightness are in a log domain, the difference between the first absolute brightness and the second absolute brightness may be 2 times.

In this instance, the controller 180 can determine that the first exposure as a long exposure is two times the second exposure as a short exposure. In addition, the controller 180 can control the first exposure such that the sensitivity of the first exposure is 4.0 and the exposure time of the first exposure is 1.0/120. In addition, the controller 180 can control the first exposure such that the sensitivity of the second exposure is 2.0 and the exposure time of the second exposure is 1.0/120. In this instance, a product of the exposure time and sensitivity of the first exposure may be two times a product of the exposure time and sensitivity of the second exposure. Meanwhile, #1, #2 and #3 may be different in terms of first absolute brightness.

For example, the first absolute brightness of #2-2 may be 3 and the second absolute brightness of #2-2 may be 5. Since the first absolute brightness and the second absolute brightness are in a log domain, the difference between the first absolute brightness and the second absolute brightness may be four times.

In this instance, the controller 180 can determine that the first exposure as long exposure is four times the second exposure as short exposure. In addition, the controller 180 can control the first exposure such that the sensitivity of the first exposure is 4.0 and the exposure time of the first exposure is 1.0/120. In addition, the controller 180 can control the first exposure such that the sensitivity of the second exposure is 1.0 and the exposure time of the second exposure is 1.0/120. In this instance, a product of the exposure time and sensitivity of the first exposure may be four times a product of the exposure time and sensitivity of the second exposure.

Conventionally, since a next exposure value was calculated, an algorithm was complicated and a target light amount may not be reached when the target light amount is changed. However, in the present invention, since control is facilitated by introducing the concept of the table, it is possible to stably extend a dynamic range. In addition, in the present invention, exposure is gradually changed by the value of the table, thereby implementing a natural image.

In addition, conventionally, since long exposure control and short exposure control are not divided, long exposure may be changed even when only short exposure is changed.

In the present invention, it is possible to independently control long exposure and short exposure by dividing Primary By and Secondary By. In addition, in the present invention, it is possible to stably change short exposure in a state of fixing long exposure. Further, by introducing the concept of the absolute brightness and determining the extension range of a dynamic range according to a difference between two absolute brightnesses, it is possible to clearly specify the extension range of the dynamic range.

In addition, a conventional invention adopts a method of reaching target brightness while adjusting sensitivity and a time. For example, in the conventional invention, an exposure is decreased when a current brightness is higher than a reference level and is increased when the current brightness is lower than the reference level. Accordingly, it takes a considerable time to reach a target brightness or target brightness may not be reached. However, in the present invention, since only an exposure value matching two pieces of absolute brightness is output, it is possible to rapidly reach target brightness and to improve accuracy.

In addition, in the conventional invention, when the target is changed, it may be difficult to control exposure. However, in the present invention, even when the target is changed, since only the exposure value according to the absolute brightness is obtained, it is possible to rapidly and naturally reach the target.

In addition, the table may be configured such that the extension range of the dynamic rage is minimized. For example, in the case of #2-2, the difference between the first absolute brightness and the second absolute brightness is four times. Although the dynamic range extends to 4 bits, if the difference between the first absolute brightness and the second absolute brightness is four times, the dynamic range can extend to only 2 bits. Accordingly, a product of the exposure time and sensitivity of the first exposure may be four times a product of the exposure time and sensitivity of the second exposure and synthesized image data may include dynamic range information of 12-bit depth.

In addition, the table can be preferentially configured such that the exposure time of the first exposure becomes equal to the exposure time of the second exposure. For example, in the case of #2-2, the first exposure is a product of sensitivity of 4.0 and an exposure time of 1.0/120 and is 4.0/120. Since the difference between the first absolute brightness and the second absolute brightness is 2, the second exposure should be 1/120 which is 1/4 of the first exposure. In this instance, as the exposure time of the first exposure becomes equal to the exposure time of the second exposure, the exposure time of the second exposure becomes 1.0/120 equal to the exposure time of the first exposure. Therefore, the sensitivity of the second exposure may be 1.0.

As another example, the table can be configured such that, when the exposure time of the second exposure should be changed to a specific value by brightness change, the exposure time of the first exposure is changed to the specific value. In the present invention, by setting the exposure times of a long exposure and short exposure to be equal to each other, it is possible to prevent a difference between an image generated by long exposure and an image generated by short exposure from being sensed.

When the camera is controlled by the first exposure information, the first exposure information is applicable to a second frame which is a subsequent frame of a first frame. This is because delay occurs according to a time from acquisition of brightness information to acquisition of exposure information.

That is, the controller 180 can control the camera 121 to perform capturing based on the first exposure information acquired from the first frame. The camera 121 can perform capturing based on the sensitivity and exposure time of the first exposure (long exposure) included in first exposure information. Therefore, the controller 180 can acquire first image data of a second frame generated by the first exposure (long exposure).

In addition, the camera 121 can perform capturing based on the sensitivity and exposure time of the second exposure (short exposure) included in the first exposure information. Therefore, the controller 180 can acquire second image data of a second frame generated by the second exposure (short exposure).

A twelfth block 1560 can store first exposure information corresponding to the first absolute brightness and second absolute brightness in a thirteenth block 1565. Specifically, the twelfth block 1560 can store the sensitivity of the first exposure (long exposure), the exposure time of the first exposure (long exposure), the sensitivity of the second exposure (short exposure) and the exposure time of the second exposure, which are the elements of the first exposure information.

In addition, the twelfth block 1560 can store identification information of a frame, to which the first exposure information is applied, in the thirteenth block 1565, along with the first exposure information. For example, if the first exposure information is applied to a second frame which is a subsequent frame of the first frame, the twelfth block 1560 can store the frame number of the second frame along with the first exposure information. The thirteenth block 1565 may be included in the storage unit 170.

In the present invention, the identification information of a frame, to which exposure information is expected to be applied, can be stored in consideration of the fact that delay is changed as the exposure elements are changed, thereby accurately finding the exposure information applied to the frame. When a sensor signal of a new frame is input, a fourteenth block 1570 can read exposure information applied to the new frame from the thirteenth block 1565. For example, if first exposure information is applied to a second frame which is a subsequent frame of the first frame, the fourteenth block 1570 can acquire the first exposure information corresponding to the second frame.

The elements of the first exposure information may be in the format recognizable by an image sensor. In this instance, a fifteenth block 1575 can transform the elements of the first exposure information into the format of a log domain. Meanwhile, operation of the second block 1510 will be described.

The second block 1510 can apply at least one of white balance and color correction to synthesized image data. Specifically, when the image sensor outputs an RGB value, the second block 1510 can apply gain of automatic white balance AWB and output an RGB value, to which a color correction matrix is applied.

In this instance, the controller 180 can control the first exposure and the second exposure based on exposure information corresponding to average brightness information and maximum brightness information of synthesized image data, to which at least one of white balance and color correction is applied. When outputting an image, white balance processing or color correction can be performed. One of the objects of the present invention is to prevent saturation of an image to be finally output. Accordingly, in the present invention, exposure can be controlled in consideration of white balance processing or color correction, thereby preventing saturation of an image to be finally output.

A method of processing one frame has been described. Next, an input of the second frame which is the subsequent frame of the first frame will be briefly described. The second frame which is the subsequent frame of the first frame is not limited to the next frame of the first frame. For example, if the first frame is an N-th frame, the second frame may be an (N+2)-th frame.

The controller 180 can control the camera 121 to perform capturing based on the first exposure information acquired from the first frame. The camera 121 can perform capturing based on the sensitivity and exposure time of the first exposure (long exposure) included in the first exposure information. Therefore, the controller 180 can acquire first image data of the second frame generated by the first exposure (long exposure).

In addition, the camera 121 can perform capturing based on the sensitivity and exposure time of the second exposure (short exposure) included in the first exposure information. Therefore, the controller 180 can acquire second image data of the second frame generated by the second exposure (short exposure).

In this instance, the controller 180 can acquire synthesized image data of the second frame obtained by synthesizing the first image data of the second frame and the second image data of the second frame. In addition, the controller 180 can acquire the first absolute brightness of the second frame based on the average brightness information of the synthesized image data of the second frame and the first exposure information applied to the second frame. In this instance, the first exposure information applied to the second frame may include information on sensitivity of the first exposure, an exposure time of the first exposure, sensitivity of the second exposure and an exposure time of the second exposure.

The controller 180 can acquire the first absolute brightness of the second frame based on the average brightness information of the synthesized image data of the second frame and the sensitivity and exposure time of the first exposure included in the first exposure information. Specifically, the controller 180 can acquire the first absolute brightness information By of the second frame based on the average log brightness information $\log_e X$ of the second frame, the log sensitivity information Sv of the first exposure and the log time information Tv of the first exposure.

In addition, the controller 180 can acquire the second absolute brightness of the second frame based on the maximum brightness information of the synthesized image data of the second frame and the first exposure information applied to the second frame. Specifically, the controller 180 can acquire the second absolute brightness of the second frame based on the maximum brightness information of the synthesized image data of the second frame and the sensitivity and exposure time of the second exposure included in the first exposure information.

More specifically, the controller 180 can acquire the second absolute brightness information By of the second frame based on the maximum log brightness information $\log_2 X$ of the second frame, the log sensitivity information Sv of the second exposure and the log time information Tv of the second exposure.

Further, the controller 180 can control the first exposure and the second exposure based on third exposure information corresponding to the first absolute brightness of the second frame and the second absolute brightness of the second frame. When the camera is controlled by the third exposure information, the third exposure information may be applied to a third frame which is a subsequent frame of the second frame.

In addition, the controller 180 can store third exposure information and the identification information of the third frame, to which the third exposure information is applied, in the storage unit 170. The above-described operation can be repeated and the controller 180 can shoot a video.

Further, the controller 180 can acquire information indicating whether an exposure program or photometric program needs to be changed. For example, when an input of changing settings of sensitivity is received or if input of changing the photometric program for calculating the absolute brightness is received, the controller 180 can change the exposure program or the photometric program.

Figure 18:
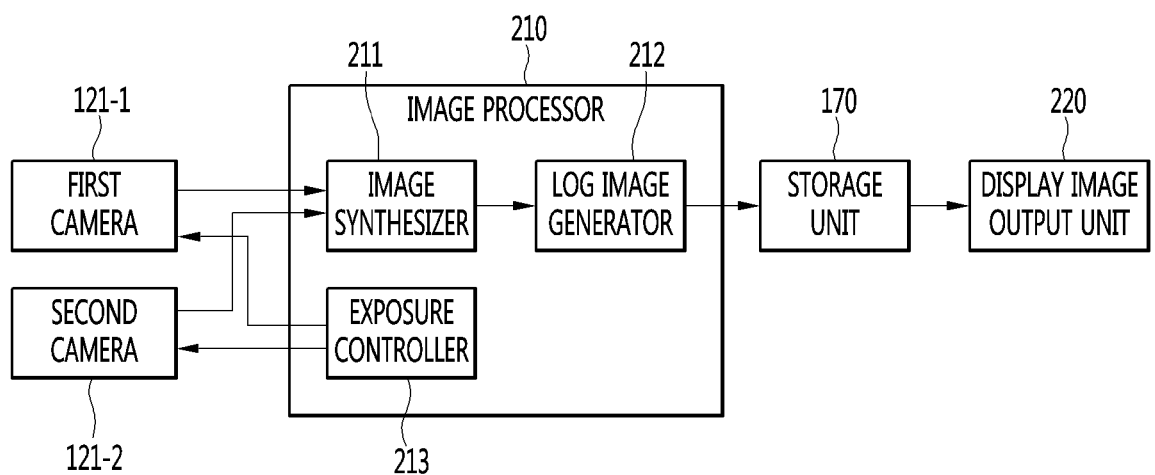
FIG. 18 is a block diagram illustrating the detailed configuration of a mobile terminal according to another embodiment of the present invention.

Next, FIG. 18 is a block diagram illustrating the detailed configuration of a mobile terminal according to another embodiment of the present invention. In FIG. 2, the plurality of image data is generated by performing continuous capturing at different exposures using one camera for a predetermined time. In FIG. 18, portions different from FIG. 2 will be focused upon.

In the embodiment of FIG. 18, a plurality of pieces of image data can be generated by performing capturing at different exposures using two cameras. Specifically, a first camera 121-1 can apply the first exposure and capture a first image, under control of the controller 180. The first camera 121-1 may include a first image sensor, and the first image sensor may transmit first image data generated by the first exposure to the controller 180.

A second camera 121-2 can apply a second exposure and capture a second image, under control of the controller 180. The second camera 121-2 may include a second image sensor, and the second image sensor may transmit second image data generated by the second exposure to the controller 180. The first exposure and the second exposure may be different from each other. Specifically, the first exposure may be long exposure and the second exposure may be short exposure.

The controller 180 can receive image data generated by the first exposure from the first image sensor. In addition, the controller 180 can receive image data generated by the second exposure from the second image sensor. Also, an image synthesizer 211 can generate image data obtained by synthesizing the first image data and the second image data.

An exposure controller 213 can control the first exposure and the second exposure based on the first exposure information corresponding to the average brightness information of the synthesized image data and the maximum brightness information of the synthesized image data. The first exposure information may include at least one of sensitivity of the first exposure, an exposure time of the first exposure, sensitivity of the second exposure and an exposure time of the second exposure.

The exposure controller 213 can perform control such that the first camera 121-1 performs capturing by a first exposure based on the sensitivity and exposure time of the first exposure. In addition, the exposure controller 213 can perform control such that the second camera 121-2 performs capturing by a second exposure based on the sensitivity and exposure time of the second exposure.

When a log image is generated using two cameras, it is possible to improve resolution as compared to when a log image is generated using one camera. The method of operating the mobile terminal according to the embodiment of the present invention includes generating synthesized image data obtained by synthesizing first image data generated by a first exposure and second image data generated by a second exposure, storing a log image obtained by applying a log profile to the synthesized image data in a first mode, controlling first exposure and second exposure based on first exposure information corresponding to average brightness information and maximum brightness information of the synthesized image data, and outputting a display image obtained by transforming the log image in a second mode.

In this instance, the outputting of the display image includes outputting the display image obtained by performing tone mapping and color grading with respect to the log image, in the second mode. The outputting of the display image includes applying a default lookup table to the log image to output the display image obtained by performing tone mapping with respect to the log image, in the second mode, and, when an input of selecting a filter is received, applying a lookup table corresponding to the filter to output the display image obtained by performing tone mapping and color grading with respect to the log image.

The storing of the log image includes outputting the log image on a preview screen in the first mode, outputting a display image obtained by transforming the log image on the preview screen when an input of touching a button on the preview screen is received, and outputting the long image when touch of the button is released. The controller is generally responsible for control of a device and may be used interchangeably with a central processing unit, a microprocessor, a processor, etc.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a camera including an image sensor;
   a memory;
   a display; and
   a processor configured to:

synthesize first image data generated by a first exposure and second image data generated by a second exposure, generate a log image obtained by applying a log profile to the synthesized image data, display the log image on a screen on the display, display a first image obtained by transforming the log image on the screen in response to a touching of a button on the screen, and redisplay the log image when the touching of the button is released.

2. The mobile terminal according to claim 1, wherein the processor is further configured to store the log image and transform the log image into a second into the first image by performing tone mapping and color grading with respect to the log image.

3. The mobile terminal according to claim 2, wherein the processor is further configured to:

transform the log image into a third image by applying a default lookup table to the log image to perform tone mapping with respect to the log image and display the third image on the display, display a plurality of filters on the display corresponding to different lookup tables with the third image transformed by applying the default lookup table, and in response to a selection of a first filter among the plurality of filters, transform the log image into the second image by applying a first lookup table to the log image to perform tone mapping and color grading with respect to the log image and display the second image on the display.

4. The mobile terminal according to claim 2, wherein the processor is further configured to:

in response to a touch input on the displayed second image, display an adjustment point of a tone adjustment curve at a point where the touch input is received and display the tone adjustment curve including the adjustment point on the display, and wherein the adjustment point is displayed at a point on the tone adjustment curve corresponding to brightness information of a region in which the touch input is received.

5. The mobile terminal according to claim 4, wherein the processor is further configured to:

change a shape of the tone adjustment curve according to a touch movement of the adjustment point and adjust a tone of the second image based on a change in the shape of the tone adjustment curve.

6. The mobile terminal according to claim 1, wherein the processor is further configured to:

display the log image on a preview screen on the display, display the first image obtained by transforming the log image on the preview screen in response to the touching of the button on the preview screen.

7. The mobile terminal according to claim 6, wherein the processor is further configured to:

store the log image in the memory while the first image is displayed on the preview screen.

8. A mobile terminal comprising:

a camera including an image sensor;

a memory;

a display; and a processor configured to:

synthesize first image data generated by a first exposure and second image data generated by a second exposure, acquire a first absolute brightness based on an average brightness information of the synthesized image data and a second exposure information applied to the synthesized image, acquire a second absolute brightness based on a maximum brightness information of the synthesized image data and the second exposure information applied to the synthesized image, and control the first exposure and the second exposure based on a first exposure information corresponding to the first absolute brightness and the second absolute brightness.

9. The mobile terminal according to claim 8, wherein the processor is further configured to:

receive the first image data of a first frame generated by the first exposure from the image sensor, receive the second image data of the first frame generated by the second exposure from the image sensor, generate the synthesized image data of the first frame obtained by synthesizing the first image data of the first frame and the second image data of the first frame, acquire the first absolute brightness based on the average brightness information of the synthesized image data of the first frame and the second exposure information applied to the first frame, acquire the second absolute brightness based on the maximum brightness information of the synthesized image data of the first frame and the second exposure information applied to the first frame, and control the first exposure and the second exposure based on the first exposure information corresponding to the first absolute brightness and the second absolute brightness.

10. The mobile terminal according to claim 9, wherein the memory stores a lookup table including a plurality of pieces of exposure information, wherein the processor is further configured to acquire the first exposure information of the plurality of pieces of exposure information, and wherein the first exposure information corresponds to the first absolute brightness among a plurality of absolute brightnesses related to the average brightness information and corresponds to the second absolute brightness among a plurality of absolute brightnesses related to the maximum brightness information.

11. The mobile terminal according to claim 9, wherein the processor is further configured to:

store the first exposure information in the memory, acquire a first absolute brightness of a second frame based on average brightness information of second synthesized image data of the second frame which is a subsequent frame of the first frame and the first exposure information applied to the second frame, acquire a second absolute brightness of the second frame based on a maximum brightness information of the second synthesized image data of the second frame and the first exposure information applied to the second frame, and control the first exposure and the second exposure based on third exposure information corresponding to the first absolute brightness of the second frame and the second absolute brightness of the second frame.

12. The mobile terminal according to claim 8, wherein the memory stores a lookup table including a plurality of pieces of exposure information, each of the plurality of pieces of exposure information including a sensitivity of the first exposure, an exposure time of the first exposure, a sensitivity of the second exposure and an exposure time of the second exposure, and wherein the processor controls the first exposure based on the sensitivity of the first exposure and the exposure time of the first exposure and controls the second exposure based on the sensitivity of the second exposure and the exposure time of the second exposure.

13. A mobile terminal comprising:

a camera including an image sensor;

a memory;

a display; and a processor configured to:

synthesize first image data generated by a first exposure and second image data generated by a second exposure, apply at least one of a white balance or a color correction to the synthesized image data, and control the first exposure and the second exposure based on first exposure information corresponding to average brightness information and maximum brightness information of the synthesized image data, to which at least one of the white balance or the color correction is applied.

* * * * *